United States Patent
Yasukawa et al.

(10) Patent No.: US 11,632,800 B2
(45) Date of Patent: Apr. 18, 2023

(54) USER EQUIPMENT AND RANDOM ACCESS METHOD

(71) Applicant: NTT DOCOMO, INC., Tokyo (JP)

(72) Inventors: Shimpei Yasukawa, Tokyo (JP); Kazuki Takeda, Tokyo (JP); Kazuaki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 593 days.

(21) Appl. No.: 16/074,160

(22) PCT Filed: Feb. 3, 2017

(86) PCT No.: PCT/JP2017/004119
§ 371 (c)(1),
(2) Date: Jul. 31, 2018

(87) PCT Pub. No.: WO2017/135455
PCT Pub. Date: Aug. 10, 2017

(65) Prior Publication Data
US 2021/0127424 A1 Apr. 29, 2021

(30) Foreign Application Priority Data

Feb. 4, 2016 (JP) .............................. JP2016-020323

(51) Int. Cl.
*H04W 74/08* (2009.01)
*H04W 52/36* (2009.01)
(Continued)

(52) U.S. Cl.
CPC ....... *H04W 74/0833* (2013.01); *H04W 52/36* (2013.01); *H04W 56/001* (2013.01); *H04W 72/044* (2013.01); *H04W 74/004* (2013.01)

(58) Field of Classification Search
CPC .......... H04W 74/0833; H04W 74/004; H04W 72/044; H04W 72/04; H04W 72/02; H04W 56/001; H04W 52/36
(Continued)

(56) References Cited

U.S. PATENT DOCUMENTS

2010/0172299 A1* 7/2010 Fischer ............... H04W 74/002
370/328
2012/0188897 A1* 7/2012 Shen .................... H04W 52/146
370/252
(Continued)

FOREIGN PATENT DOCUMENTS

EP 2887561 A1 6/2015
JP 2012-039400 A 2/2012
(Continued)

OTHER PUBLICATIONS

International Search Report issued in PCT/JP2017/004119 dated Mar. 28, 2017 (9 pages).
(Continued)

*Primary Examiner* — Candal Elpenord
(74) *Attorney, Agent, or Firm* — Osha Bergman Watanabe & Burton LLP

(57) ABSTRACT

A user equipment communicating with a base station in a wireless communication system including the base station and the user equipment, the user equipment including: a storage unit configured to store correspondence information where an identifier of a beam formed by the base station and configuration information used for transmission of a random access signal are associated with each other; a selection unit configured to select a specific beam on the basis of reception quality of signals transmitted from the base station by using
(Continued)

a plurality of different beams and select configuration information corresponding to the specific beam on the basis of the correspondence information; and a transmission unit configured to transmit the random access signal to the base station by using the configuration information selected by the selection unit.

7 Claims, 20 Drawing Sheets

(51) Int. Cl.
    *H04W 56/00* (2009.01)
    *H04W 74/00* (2009.01)
    *H04W 72/04* (2009.01)
    *H04W 72/044* (2023.01)
(58) Field of Classification Search
    USPC .......................................................... 370/336
    See application file for complete search history.

(56) References Cited

U.S. PATENT DOCUMENTS

| | | | |
|---|---|---|---|
| 2013/0286960 | A1 | 10/2013 | Li et al. |
| 2014/0056251 | A1 | 2/2014 | Ahn et al. |
| 2014/0177607 | A1 | 6/2014 | Li et al. |
| 2016/0253440 | A1* | 9/2016 | Iyengar .................. G06F 30/20 703/2 |
| 2017/0048826 | A1 | 2/2017 | Kishiyama |
| 2017/0094531 | A1 | 3/2017 | Kakishima et al. |
| 2017/0181134 | A1* | 6/2017 | Niu ...................... H04B 17/318 |
| 2017/0231011 | A1* | 8/2017 | Park .................... H04W 74/006 |
| 2018/0110074 | A1* | 4/2018 | Akkarakaran .... H04W 74/0833 |
| 2018/0310230 | A1* | 10/2018 | Niu ....................... H04W 48/12 |
| 2018/0359790 | A1* | 12/2018 | Ingale .................. H04W 28/16 |

FOREIGN PATENT DOCUMENTS

| | | |
|---|---|---|
| JP | 2013034204 A | 2/2013 |
| JP | 2014513505 A | 5/2014 |
| JP | 2015-523757 A | 8/2015 |
| JP | 2015-185952 A | 10/2015 |
| JP | 2015-216412 A | 12/2015 |
| WO | 2015/147717 A1 | 10/2015 |
| WO | 2015/166840 A1 | 11/2015 |

OTHER PUBLICATIONS

Written Opinion of the International Searching Authority issued in PCT/JP2017/004119 dated Mar. 28, 2017 (5 pages).
3G TR 25.887 V1.3.0; "3rd Generation Partnership Project; Technical Specification Group Radio Access Network; Beamforming Enhancements (Release 6)"; Oct. 2002 (3GPP TSG-RAN WG4#25 R4-021605) (10 pages).
NTT Docomo, Inc.; "Design for RACH Procedure for NR"; 3GPP TSG RAN WG1 Meeting #86, R1-167378; Goteborg, Sweden; Aug. 22-26, 2016 (4 pages).
Nokia, Alcatel-Lucent Shanghai Bell; "Support for Beam Based Common Control Plane"; 3GPP TSG-RAN WG1#85, R1-165364; Nanjing,P.R. China; May 23-27, 2016 (5 pages).
3GPP TS 36.321 V12.6.0; "3rd Generation Partnership Project; Technical Specification Group Radio Access Network; Evolved Universal Terrestrial Radio Access (E-UTRA); Medium Access Control (MAC) protocol specification (Release 12)"; Jun. 2015 (77 pages).
Office Action issued in the counterpart Australian Patent Application No. 2017215885, dated Aug. 31, 2020 (5 pages).
Extended European Search Report issued in counterpart European Patent Application No. 17747606.6, dated Jul. 3, 2019 (9 Pages).
Office Action in counterpart Japanese Patent Application No. 2017-565672 dated Oct. 20, 2020 (5 pages).
Office Action issued in European Application No. 17747606.6; dated May 14, 2021 (8 pages).
Office Action in counterpart Chinese Patent Application No. 201780009353.X dated Apr. 12, 2021 (14 pages).
Office Action in counterpart Japanese Patent Application No. 2017-565672 dated Apr. 6, 2021 (4 pages).
Office Action in counterpart Australian Patent Application No. 2017215885 dated May 14, 2021 (3 pages).
Office Action in counterpart Chinese Application No. 201780009353.X dated Sep. 17, 2021 (12 pages).
Notice of Termination of Reconsideration by Examiners before Appeal Proceedings issued in counterpart Japanese Application No. 2017-565672 dated Aug. 3, 2021 (6 pages).
Office Action in counterpart European Patent Application No. 17747606.6 dated Jul. 6, 2020 (7 pages).
Notification of Reexamination in counterpart Chinese Patent Application No. 201780009353.X dated Sep. 30, 2022 (13 pages).
Office Action in counterpart Chinese Patent Application No. 201780009353.X dated Jan. 19, 2023 (25 pages).

* cited by examiner

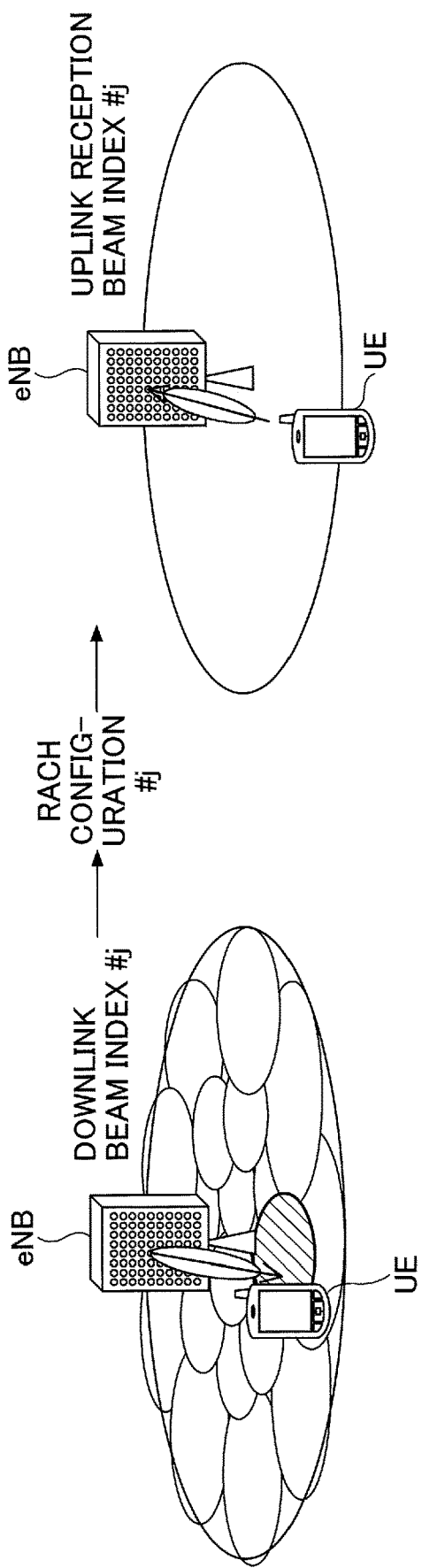

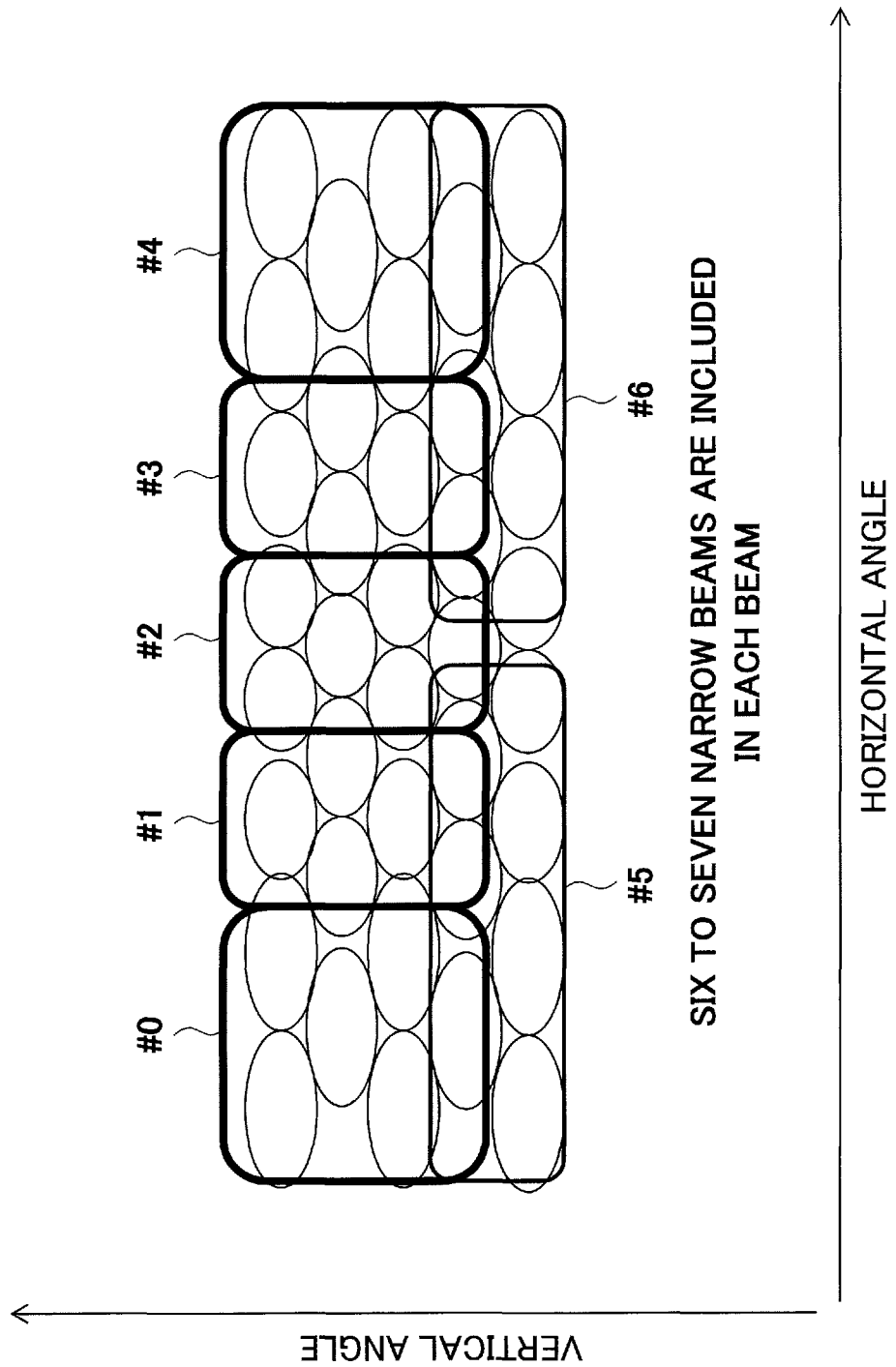

| BEAM 1 | RACH CONFIGURATION 1 |
|---|---|
| BEAM 2 | RACH CONFIGURATION 2 |
| BEAM 3 | RACH CONFIGURATION 3 |
| BEAM 4 | RACH CONFIGURATION 4 |
| BEAM 5 | RACH CONFIGURATION 5 |
| BEAM 6 | RACH CONFIGURATION 6 |

| BEAM 1 | RACH CONFIGURATION 1 |
|---|---|
| BEAM 2 | |
| BEAM 3 | |
| BEAM 4 | RACH CONFIGURATION 2 |
| BEAM 5 | |
| BEAM 6 | |

1 : N

| | |
|---|---|
| BEAM 1 | RACH CONFIGURATION 1 |
| | RACH CONFIGURATION 2 |
| | RACH CONFIGURATION 3 |
| BEAM 2 | RACH CONFIGURATION 4 |
| | RACH CONFIGURATION 5 |
| | RACH CONFIGURATION 6 |

USER EQUIPMENT AND RANDOM ACCESS METHOD

TECHNICAL FIELD

The present invention relates to a random access procedure executed between a user equipment and a base station in a mobile communication system.

BACKGROUND ART

An aim of a next-generation mobile communication system 5G is to broaden the band by using frequencies higher than the existing frequencies. However, since radio wave propagation loss increases at high frequencies, in order to compensate for the loss, it is considered to perform beam forming by applying Massive MIMO (large scale MIMO using a large number of antennas).

Beam forming is a technique for allowing a plurality of transmission (reception) antennas to have directionality to a transmission (reception) beam by controlling amplitude and phase of each signal. A high gain can be obtained by narrowing the beam width.

As illustrated in FIG. 1, the base station eNB having the function of Massive MIMO can perform beam forming with a narrow beam width, and a coverage of the user equipment UE can be secured even at high frequencies. In a case where the beam forming cannot be used, repetitive transmission or the like is necessary for securing coverage.

CITATION LIST

Non-Patent Document

Non-Patent Document 1: 3GPP TS 36.321 V12. 6.0 (2015-06)

SUMMARY OF THE INVENTION

Problem to be Solved by the Invention

It is assumed that the beam forming which the base station eNB (hereinafter, referred to as an eNB) executes with respect to the user equipment UE (hereinafter, referred to as an UE) is executed/controlled on the basis of a channel state between the eNB and the UE. If the UE is in a state in which the UE is connected to the eNB, the eNB can perform beam forming on the basis of the channel state information notified from the UE.

However, in the random access (Non-Patent Document 1) performed before the UE is connected to the eNB, the eNB cannot acquire the channel state information, so that it is difficult to apply the beam forming.

For example, in a case where the eNB receives the RACH preamble in an omni-pattern without applying the reception beam forming, repetitive transmission by the UE is required in order to expand the coverage, and the overhead and delay are increased. In addition, in a case where the eNB receives the RACH preamble with applying the reception beam forming, if the UE transmitting the RACH preamble does not perform beam selection, there is a possibility that the coverage may be further degenerated due to the reception by improper beam forming.

The present invention is to provide a technique capable of allowing a base station to appropriately apply a beam in random access performed between a user equipment and a base station.

Means for Solving the Problem

According to an embodiment of the present invention, there is provided a user equipment communicating with a base station in a wireless communication system including the base station and the user equipment, the user equipment including:

a storage unit configured to store correspondence information where an identifier of a beam formed by the base station and configuration information used for transmission of a random access signal are associated with each other;

a selection unit configured to select a specific beam on the basis of reception quality of signals transmitted from the base station by using a plurality of different beams and select configuration information corresponding to the specific beam on the basis of the correspondence information; and a transmission unit configured to transmit the random access signal to the base station by using the configuration information selected by the selection unit.

According to an embodiment of the present invention, there is provided a user equipment communicating with a base station in a wireless communication system including the base station and the user equipment, the user equipment including:

a storage unit configured to store a transmission pattern having a plurality of pieces of configuration information which are to be used for transmission of a random access signal and are associated with beams formed by the base station; and a transmission unit configured to transmit the random access signal plural times by using each configuration information in the transmission pattern without waiting for a random access response.

According to an embodiment of the present invention, there is provided a random access method executed by a user equipment communicating with a base station in a wireless communication system including the base station and the user equipment, wherein the user equipment includes a storage unit which stores correspondence information where an identifier of a beam formed by the base station and configuration information used for transmission of a random access signal are associated with each other, and wherein the random access method includes:

a selection step of selecting a specific beam on the basis of reception quality of signals transmitted from the base station by a plurality of different beams and selecting the configuration information corresponding to the specific beam on the basis of the correspondence information; and a transmission step of transmitting a random access signal to the base station by using the configuration information selected in the selection step.

According to an embodiment of the present invention, there is provided a random access method executed by a user equipment communicating with a base station in a wireless communication system including the base station and the user equipment, wherein the user equipment includes a storage unit which stores a transmission pattern having a plurality of pieces of configuration information which are to be used for transmission of a random access signal and are associated with beams formed by the base station, and wherein the random access method includes a transmission step of transmitting the random access signal plural times by using each configuration information in the transmission pattern without waiting for a random access response.

Effect of the Invention

There is provided a technique capable of allowing a base station to appropriately apply a beam in random access performed between a user equipment and a base station.

BRIEF DESCRIPTION OF DRAWINGS

FIG. 5B is a diagram illustrating basic operations in the first embodiment;
FIG. 8 is a diagram illustrating an example of a hierarchical beam configuration;
FIG. 9A is a diagram illustrating an example of correspondence between downlink beam indexes and RACH configurations;
FIG. 9B is a diagram illustrating an example of correspondence between downlink beam indexes and RACH configurations.

MODE(S) FOR CARRYING OUT THE INVENTION

Hereinafter, embodiments of the present invention will be described with reference to the drawings. The embodiments described hereinafter are merely exemplary ones, and the embodiments to which the present invention is applied are not limited to the following embodiments. For example, a mobile communication system according to the embodiment is assumed to be a system in accordance with LTE. However, the present invention is not limited to LTE, but the present invention may be applied to other schemes. In the specification and the claims, the term "LTE" is used in a broad sense that the LTE may include communication schemes (including 5G) corresponding to 3GPP Rel-12, 13, 14, or later.

(System Configuration)

Figure 1:
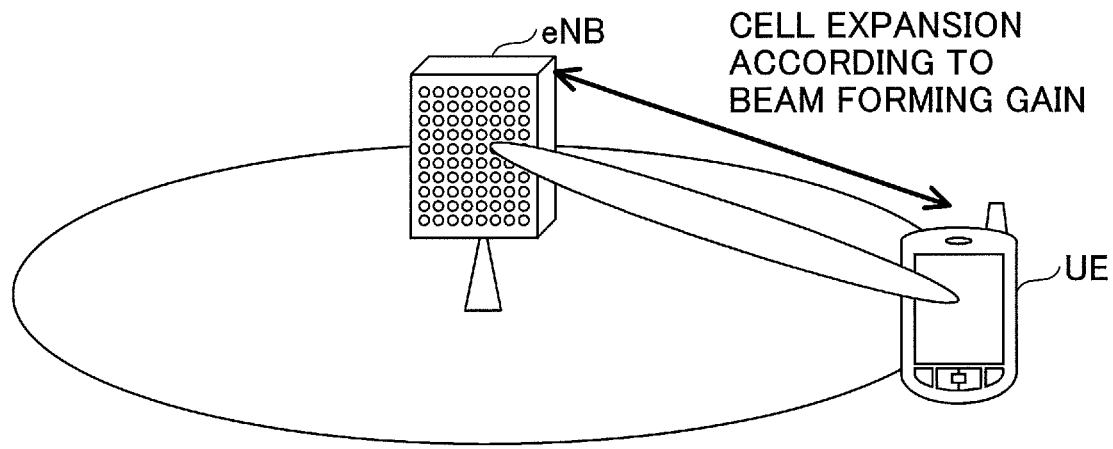
FIG. 1 is a diagram for explaining beam forming.
Figure 2:
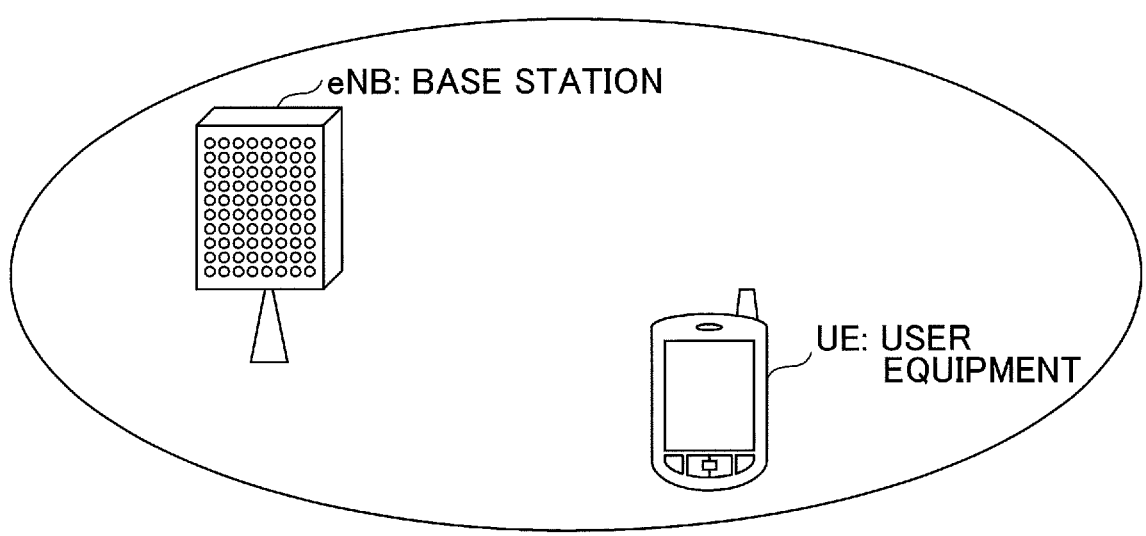
FIG. 2 is a system configuration diagram according to an embodiment of the present invention.

FIG. 2 illustrates an overall configuration diagram of a wireless communication (mobile communication) system according to the embodiments (common to the first embodiment, the second embodiment, and the modified example) of the present invention. The wireless communication system according to the embodiment is configured to include a base station eNB constituting a cell and a user equipment UE (hereinafter, referred to as a UE) communicating with the base station eNB (hereinafter, referred to as an eNB). Each of the eNB and the UE has at least a function of LTE.

The eNB in the embodiment has a function of a massive MIMO, so that the eNB can form various beams ranging from a wide beam to a narrow beam. The eNB can not only form a beam in transmission/reception of data, but also the eNB can form a beam in transmission/reception of a synchronization signal, a reference signal, a broadcast signal, or the like.

The UE may be a UE capable of performing beam forming transmission or a UE not performing the beam forming transmission. Hereinafter, basically, it is assumed that the UE does not perform the beam forming transmission.

(Random Access Procedure)

The present embodiment mainly targets random access to be performed by the UE with respect to the eNB. Therefore, first, the basic processing of the random access procedure will be described.

The random access (hereinafter, referred to as RA) is performed, for example, in a case where the UE establishes connection with the eNB at the time of originating, or due to handover, or the like, and the main purpose of the random access is to establish uplink synchronization. As the RA procedure, there are a contention based RA procedure and a contention free RA procedure. The contention based RA procedure can be used for all purposes, and the contention free RA procedure is used for specific purposes such as handover.

Figure 3:
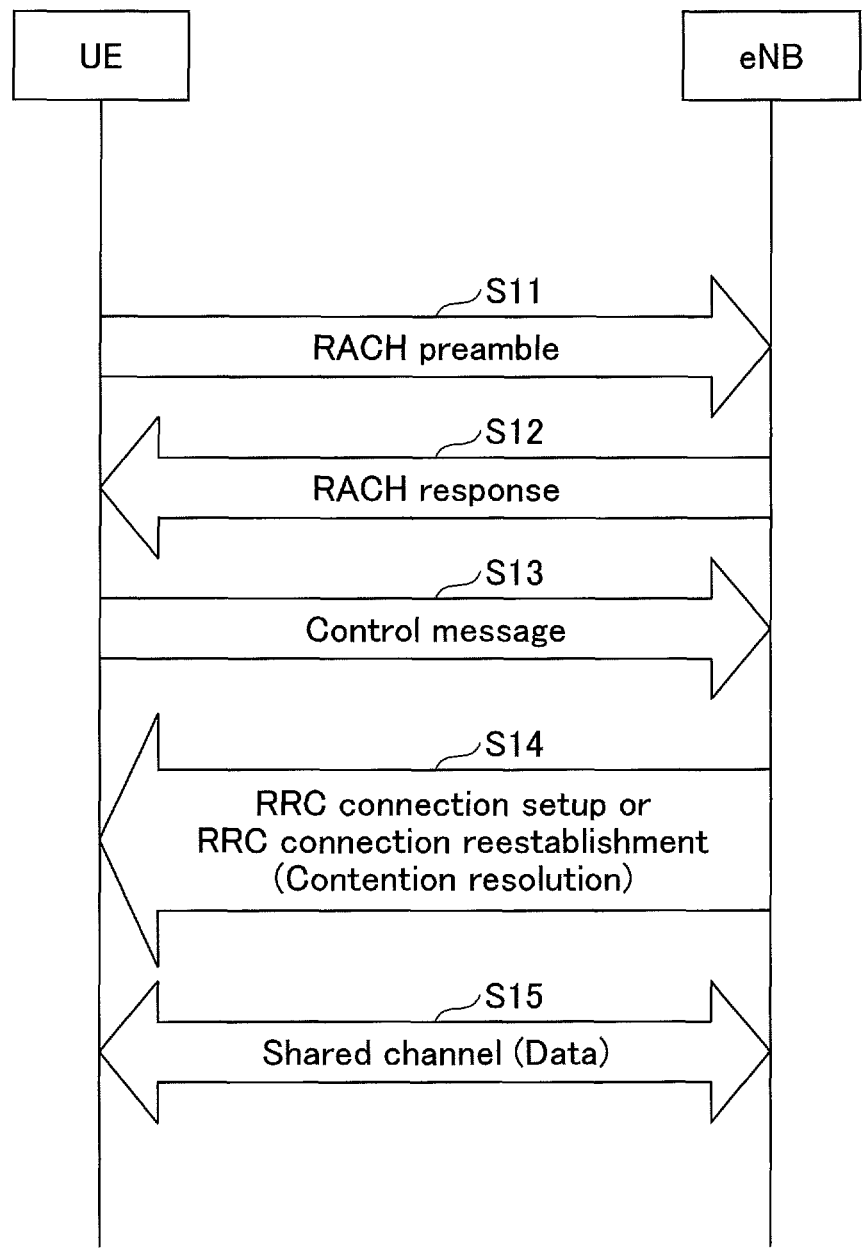
FIG. 3 is a diagram illustrating a contention based random access procedure.

First, the contention based RA procedure will be described with reference to FIG. 3. The UE transmits a RACH preamble (selected preamble sequence) through a PRACH (Physical Random Access Channel) using one preamble sequence among a predetermined number of preamble sequences (step S11). If there is no other UE performing random access using the same sequence at the same time, collision does not occur.

The eNB that has received the RACH preamble can estimate transmission timing of the UE. In step S12, the eNB uses a DL-SCH (downlink shared channel) to transmit a RACH response to the UE. The RACH response includes a TA (timing advance) command for adjusting the transmission timing of the UE, an index of the detected RACH preamble, uplink resource allocation information (UL grant), and the like.

The UE that have received the RACH response adjusts uplink timing and transmits a control message such as an RRC connection request to the eNB through an UL-SCH (uplink shared channel) using the allocated resource (step S13).

In a case where the UE that has transmitted the RACH preamble fails to receive the RACH response (in a case where the random access attempt fails), every time the UE fails, the UE increases the transmission power by a predetermined step size to transmit the PRACH. Such operation is called power ramping.

In step S14, the eNB transmits contention resolution (contention resolution message) in the DL-SCH. The UE that has received the contention resolution completes the random access processing by confirming that its own ID (for example, TC-RNTI which is used for scrambling in step S13) is included, and after that, the UE performs transmission and reception of data (step S15).

Figure 4:
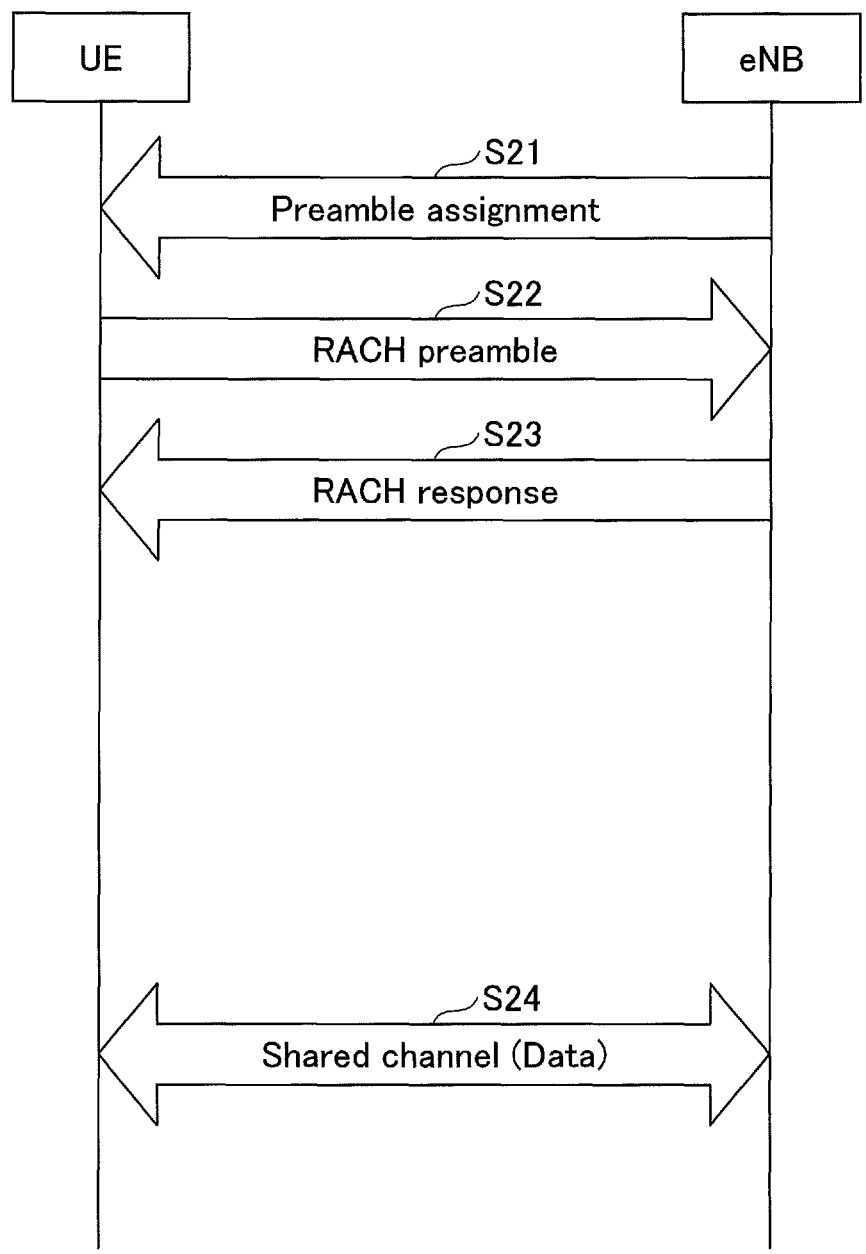
FIG. 4 is a diagram illustrating a contention free type random access procedure.

FIG. 4 illustrates the contention free RA procedure. In the contention free RA procedure, in step S21, a preamble is allocated from the eNB to the UE. The UE transmits the preamble through the PRACH (step S22), and receives the RACH response from the eNB (step S23). Since the contention resolution is unnecessary in the contention free RA procedure, the random access processing is completed in step S23, and after that, transmission and reception of data are performed (step S24).

Hereinafter, the first and second embodiments will be described.

First Embodiment

<Details of Processing>

First, the first embodiment will be described. The basic operations in the embodiment will be described with reference to FIGS. 5A and 5B. In the first and second embodiments, it is assumed that the wireless communication system operates in TDD. However, the wireless communication system may operate in FDD.

In the embodiment, the eNB can form a plurality of downlink beams. In addition, it is assumed that each beam is assigned with an index (hereinafter, a beam with index of 1 is denoted as a beam 1, and the like).

In the embodiment, the eNB transmits a beam selection signal by using each beam so that the UE can select an appropriate downlink beam. The beam selection signal includes, for example, a synchronization signal (for example, PSS or SSS), a broadcast signal (for example, a signal transmitted through a PBCH), system information (for example, SIB), a reference signal (for example, CRS or CSI-RS), or any combination of these signals.

The beam selection signal of each beam is transmitted by using a predetermined frequency resource, a predetermined time resource, or a predetermined frequency and time resource. For example, the eNB may transmit a beam selection signal by using a beam 1 in a resource 1 (for example, a certain subframe) and transmit a beam selection signal by using a beam 2 in a resource 2 (for example, another subframe). Like this, a beam selection signal is transmitted by using each beam. The image is drawn on the left side of FIGS. 5A and 5B. In addition, the aforementioned "resource" includes a "sequence" of beam selection signals. For example, in beam 1 and beam 2, the beam selection signals of different sequences (a sequence 1 being used for the beam 1 and a sequence 2 being used for the beam 2) may be transmitted by using the same frequency and time resource.

The UE retains information (referred to as correspondence information A) on correspondence between the downlink beam index and the downlink resource in advance. For example, the UE retains the correspondence information A indicating correspondence such that a downlink beam 1 corresponds to a resource 1 and a downlink beam 2 corresponds to a resource 2. For example, the correspondence information A may be preconfigured in the UE, or may be notified from the eNB to the UE by broadcast information, upper layer signaling, or the like.

In addition, in the embodiment, an uplink resource configuration (referred to as a RACH configuration) used by the UE to transmit an RACH preamble is associated with a downlink beam index in advance. The correspondence information between the RACH configuration and the downlink beam index is called correspondence information B.

The RACH configuration is configured with any one of a time resource, a frequency resource, a preamble sequence, a combination of any two thereof, or a combination of three thereof. As an example, if it is assumed that the RACH configuration is a combination of the time resource and the frequency resource (denoted by a time and frequency resource), the downlink beam and the RACH configuration (resource) are associated with each other such that the RACH configuration corresponding to the downlink beam 1 (denoted by the RACH configuration 1, hereinafter the same) is a time and frequency resource 1 and the RACH configuration 2 is a time and frequency resource 2.

For example, the correspondence information B indicating the correspondence between downlink beam indexes and RACH configurations may be preconfigured in the UE, or the correspondence information may be notified from the eNB to the UE by broadcast information, upper layer signaling, or the like. Alternatively, the correspondence information may be notified by using downlink L1/L2 control information for each subframe or each group of subframes. For example, the correspondence information B is information on correspondence between an index and a resource (any one or combination of time, frequency, and sequence as described above) like (index 1, resource 1) and (index 2, resource 2). In the case of notifying of the correspondence information B in units of subframes, with respect to the subframe among the resources, implicit notification using the subframe on which control information has been transmitted can be performed.

The eNB of the embodiment can form a beam (having the same directivity and beam width as those of a transmission beam) similar to the transmission beam transmitting the beam selection signal as a reception beam on the reception side. It is assumed that the same index as that of the corresponding transmit beam is assigned to the reception beam.

In the embodiment, since the RACH configuration is used according to beam selection, a selectable RACH configuration may be restricted according to a state of the UE. For example, a plurality of RACH configurations may be notified so that the UE can select a RACH configuration according to a UE moving speed, estimated Doppler frequency, position, terminal capability or the like.

In the eNB, in the reception beam identified by each index, the RACH preamble is received by using the resource of the RACH configuration identified by the index. For example, an RACH preamble that is to be transmitted by using the resource of the RACH configuration 1 is received by using an uplink beam 1 (uplink beam corresponding to the downlink beam 1) corresponding to the RACH configuration 1, and an RACH preamble that is to be transmitted by using the resource of the RACH configuration 2 is received by using an uplink beam 2 (uplink beam corresponding to the downlink beam 2) corresponding to the RACH configuration 2.

Figure 5A:
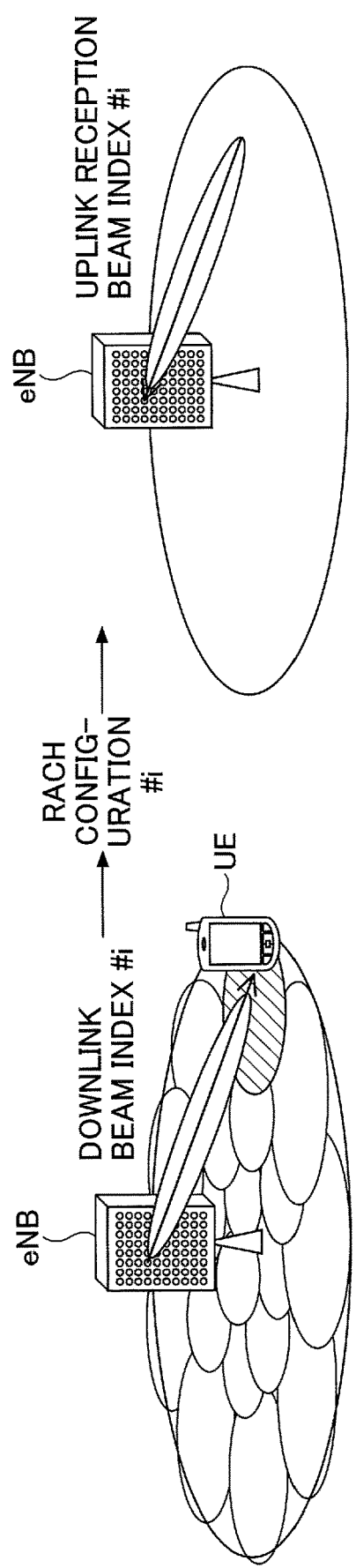
FIG. 5A is a diagram illustrating basic operations in the first embodiment.

A more specific example is described with reference to FIG. 5A. As illustrated in FIG. 5A, the eNB transmits a beam selection signal by using each beam. The UE measures the beam selection signal that is to be received by using a resource corresponding to each beam and specifies, for example, a resource of a beam selection signal having the highest reception level (reception power). Instead of the reception level, reception quality (RSRQ or the like) may be used. Hereinafter, the same is applied to the "reception level". In addition, the "reception quality" may be used in a sense including the reception level.

Next, the UE specifies a downlink beam index corresponding to the resource of the beam selection signal having the highest reception quality, on the basis of the above-described correspondence information A between the downlink beam index and the downlink resource.

In the example of FIG. 5A, i is specified as a downlink beam index. Subsequently, the UE selects a RACH configuration (RACH configuration i) corresponding to the index i on the basis of the correspondence information B and transmits a RACH preamble by using the RACH configuration i. The eNB can receive the RACH preamble by applying the reception beam i.

In the example of FIG. 5B, the UE specifies j as a downlink beam index. Subsequently, the UE selects a RACH configuration (RACH configuration j) corresponding to the index j on the basis of the correspondence information B and transmits a RACH preamble by using the RACH configuration j. The eNB can receive the RACH preamble by applying a reception beam j.

Due to the above-described configuration, in the eNB, it is possible to apply reception beam forming similar to the downlink beam of the corresponding downlink beam index for each RACH configuration. As a result, even in the RACH reception of the eNB, it is possible to obtain reception beam forming gain. In the case of TDD assumed in the embodiment, since channel characteristics of the uplink and the downlink are common due to reciprocity of the propagation path, the above-described configuration is preferred. In addition, the above-described configuration may be applied to FDD. This is because, even in the case of FDD, there is some commonality in the channel characteristics of the uplink and downlink. For example, in the case of FDD, if the propagation loss in signal transmission by using a certain downlink beam is large (small), it can be considered that the signal reception quality is bad (good) in an uplink beam having the same direction (reverse direction) and width as the direction and width of a downlink beam.

<Example of Sequence>

Figure 6:
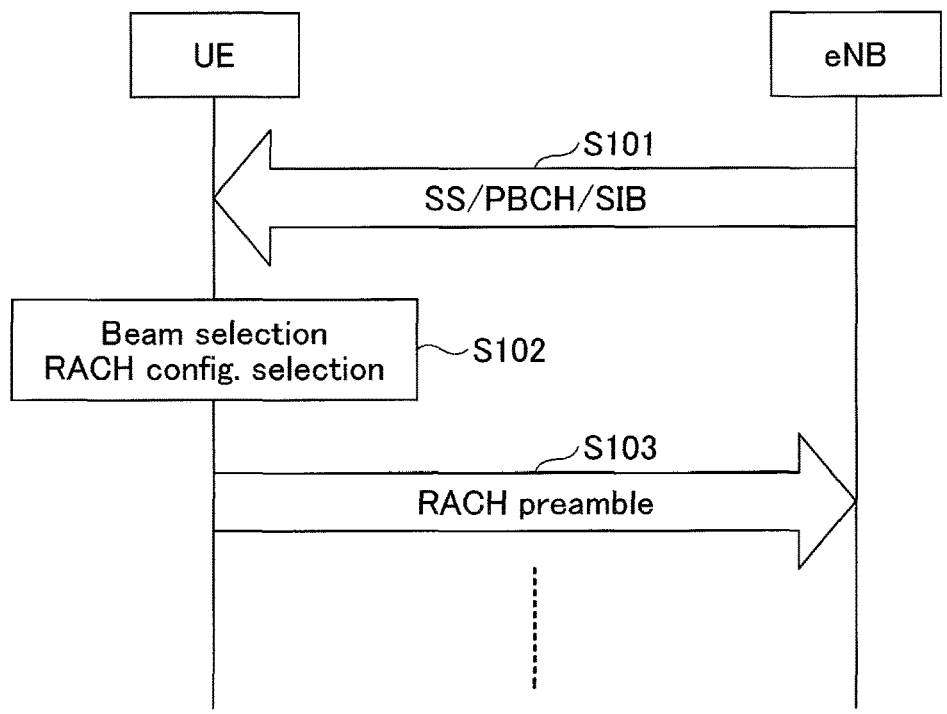
FIG. 6 is a diagram illustrating a procedure (contention based) up to RA preamble transmission in the first embodiment.

FIG. 6 illustrates an example of a sequence of a contention based RA procedure according to the embodiment. As illustrated in FIG. 6, a beam selection signal (SS, PBCH, SIB, or the like) is transmitted from the eNB to the UE by using each beam (step S101).

The UE selects, for example, a beam selection signal (that is, a downlink beam) having the highest reception level among the beam selection signals received by resources corresponding to respective beams and selects a RACH configuration corresponding to the downlink beam (Step S102). Next, the UE transmits a RACH preamble by using the RACH configuration (step S103).

The subsequent procedure is the same as the procedure after step S12 described with reference to FIG. 3. However, in the embodiment, the eNB performs the subsequent downlink transmission by using the downlink beam corresponding to the resource (uplink beam) by which the RACH preamble has been received and performs the subsequent reception by using the uplink beam.

For example, in a case where the eNB receives a RACH preamble by using the uplink beam 1, the eNB transmits a RACH response by using the downlink beam 1. As a result, the UE can receive the RACH response with good quality.

Figure 7:
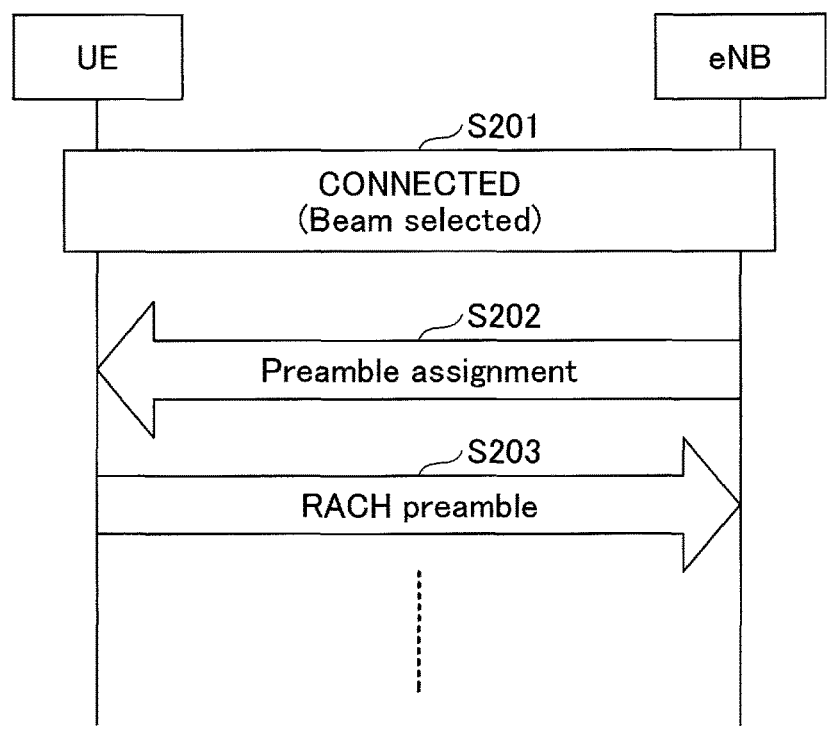
FIG. 7 is a diagram illustrating a procedure (contention free) up to RA preamble transmission in the first embodiment.

FIG. 7 illustrates a sequence of a contention free RA procedure in the embodiment. In the case of FIG. 7, in the connection state in step S201, at that time, the UE has already selected a downlink beam (RACH configuration). This selection is performed, for example, at the first time of RA to the eNB (procedure of FIG. 6). Next, in step S202, a preamble to be used by the UE is transmitted from the eNB. Next, in step S203, the UE transmits the RACH preamble. For example, if it is assumed that the downlink beam 1 is selected as the downlink beam at the time of step S201, the UE transmits the RACH preamble by using the RACH configuration 1 in step S203.

In the preamble assignment of step S202 in the contention free RA procedure, the eNB may notify the UE of a transmission time and frequency resource as well as the preamble sequence. In this case, the UE transmits the RACH preamble by using the transmission time and frequency resource.

For example, the above-described transmission time and frequency resource is a resource associated with a reception beam that can allow an uplink signal to be received from the UE with good quality (high reception level). The reception beam is, for example, a beam that the eNB has selected on the basis of the signal from the UE in the connected state of step S201.

<Detailed Example>

—Correspondence Between Downlink Beam Index and RACH Configuration—

As described above, the correspondence information B between the downlink beam indexes and the RACH configurations is notified from the eNB to the UE, for example, as a broadcast signal. Alternatively, the eNB may notify of a RACH configuration independently for each downlink beam, so that the UE may be allowed to have the correspondence information B between the RACH configuration and the downlink beam index.

For example, the eNB notifies a RACH configuration X (RACH configuration identified by the index 1) by using the downlink beam 1 and notifies a RACH configuration Y by using the downlink beam 2. On the basis of the correspondence information A, the UE recognizes that the downlink beam index of the resource that has received the "RACH configuration X" is 1 and retains the downlink beam index 1 and the RACH configuration X in a correspondence manner. In addition, the UE recognizes that the downlink beam index of the resource that has received the "RACH configuration Y" is 2 and retains the downlink beam index 2 and the RACH configuration Y in a correspondence manner.

The correspondence between the downlink beam indexes and the RACH configurations may be 1:1 correspondence, N:1 correspondence, or 1:N correspondence. N is an integer of 2 or more.

Before describing the N:1/1:N correspondence, hierarchization of beams (also referred to as grouping) will be described. In the embodiment, with respect to each of the uplink beam and the downlink beam, for example, as illustrated in FIG. 8, the eNB can form hierarchical beams. In the example illustrated in FIG. 8, a large number of narrow beams indicated by small rings (horizontally elongated rings) can be formed, and wide beams (#0 to #6) can be formed with such a size as that of bundling six to seven narrow beams. The example of FIG. 8 is an example of a hierarchical structure (grouping) of two hierarchies. However, the number of hierarchies may be three or more.

FIG. 9A illustrates an example of 1:1 correspondence between the downlink beam indexes and the RACH configurations. As illustrated in FIG. 9A, like the beam 1 and the RACH configuration 1, the downlink beam index and the RACH configuration are associated with each other in a 1:1 manner.

FIG. 9B illustrates an example of N:1 correspondence. As illustrated in FIG. 9B, one RACH configuration is associated with a plurality of downlink beam indexes like the beams 1 to 3 and the RACH configuration 1. In this case, in a case where one of the beams 1 to 3 is selected on the basis of the reception level (reception quality) of the beam selection signal, the UE selects the RACH configuration 1.

Next, in this case, in the eNB, the reception wide beam corresponding to the width of the bundle of N beams is associated with the RACH configuration (resource), and on the basis of the correspondence, the eNB receives a RACH preamble by using the RACH configuration corresponding to each reception wide beam. In the above-described example, the eNB receives the RACH preamble transmitted by using the RACH configuration 1 by applying the wide beam bundled with the beams 1 to 3 as the reception beam. Next, for example, the eNB transmits a RACH response to the UE by using a downlink wide beam corresponding to the wide beam.

In this manner, since the N:1 correspondence is employed, the eNB can receive the RACH preamble by using a wider beam and can reduce the influence of the beam selection error. In the above-described example, instead of using a wide beam separately from the beams 1 to 3 (three reception beams 1 to 3 corresponding thereto), the RACH preamble of the RACH configuration 1 may be received by using the reception beams 1 to 3.

Figures 9C, 10:
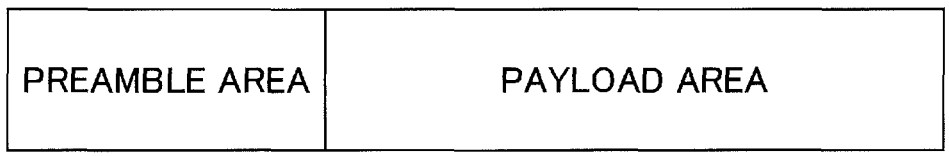
FIG. 9C is a diagram illustrating an example of correspondence between downlink beam indexes and RACH configurations.
FIG. 10 is a diagram illustrating an example of an RA preamble having a payload area.

FIG. 9C illustrates an example of 1:N correspondence. As illustrated in FIG. 9C, like the beam 1 and the RACH configurations 1 to 3, a plurality of RACH configurations are associated with one downlink beam index. In this case, the beam which is used to transmit the beam selection signal may be the same as the beam in the case of 1:1 correspondence or may be such a wide beam as the beam used in the case of N:1 correspondence. In the case of 1:N correspondence, for example, in a case where the UE selects the beam 1 on the basis of the beam selection signal, one RACH configuration is, for example, randomly selected from the RACH configurations 1 to 3 to be used.

In the case of 1:N correspondence, for example, even in a case where UE-A and UE-B select the same beam 1, there is a possibility that the UE-A and the UE-B select different RACH configurations (for example, different preamble sequences). Therefore, in the case of 1:N correspondence, it is possible to reduce collision probability among a plurality of UEs which select the same beam.

Herein, the width of the downlink beam formed by the eNB may not be uniform. For example, the beam toward the center of the cell can be configured as a wide beam, and the beam at the edge of the cell can be configured as a narrow beam. Therefore, in a case where the size of the downlink beam is not uniform, in order to avoid an increase in power ramping, any one or both of the transmission power offset and the target reception level may be configured for each RACH configuration. Namely, transmission power information is included in the information of the RACH configuration.

For example, a transmission power boost (offset for increasing the transmission power) may be applied to a wide beam at the center of the cell. Namely, in this case, the beam index of the wide beam is associated with a transmission power offset indicating the transmission power boost as well as the RACH configuration.

—Beam Selection in Case of Applying Hierarchical Beam Configuration—

For each beam that is used to transmit a beam selection signal, the eNB may transmit it by using beams of various widths like a wide beam, a medium-width beam, and a narrow beam. For example, as illustrated in FIG. 8, a beam selection signal is transmitted by using a narrow beam, and a beam selection signal is transmitted by using a wide beam. Even in this case, the retention of the correspondence information A between the index of each beam and the resource in the UE and the correspondence information B between the index of each beam and the RACH configuration and the beam selection operation can be performed in the same manner as described above.

Furthermore, for example, information indicating the beam hierarchy (for example, wide, narrow) may be added to the beam index, and the UE may select a beam of any one of hierarchies.

As an example, it is assumed that a hierarchy (layer) A is a wide beam, a hierarchy B is a narrow beam, and the indexes of the beams in the correspondence information A/B include information of hierarchies like "beam 1 (hierarchy A)", "beam 1-1 (hierarchy B)", and "beam 1-2 (hierarchy B)".

Herein, for example, in a case where, according to a result of measurement of reception of the beam selection signal of each beam, the UE detects that the reception level at the beam 1 is the best at the hierarchy A and the reception level at the beam 1-2 is the best at the hierarchy B, for example, the UE selects the beam 1-2 having the highest reception level between the hierarchy A and the hierarchy B.

In addition, the UE may select the hierarchy on the basis of one of its own capability (UE capability), location, moving speed (mobility), and coverage state (center of the cell, edge of the cell, or the like) or any combination thereof and may select the best beam in the hierarchy. The selection criterion (hierarchy determination threshold or the like) may be configured by a broadcast signal or upper layer signaling from the eNB to the UE or may be configured in advance.

For example, if it is assumed that a threshold value of the latest average moving speed (mobility) is set as the aforementioned threshold value, in a case where the average moving speed of itself is the threshold value or more (high mobility), the UE selects a wide beam with tolerance to high mobility, and in a case where the average moving speed is less than the threshold value (low mobility), the UE selects a narrow beam (large capacity). In addition, for example, the UE with low reception level and low measurement accuracy may select a wide beam.

Due to the operation of selecting the beam hierarchy as described above, the beam hierarchy can be changed according to the state of the UE, and the possibility of beam selection error can be reduced.

—RA Preamble—

As the RA preamble in the embodiment, the same RA preamble as conventional one may be used. In the conventional technique, the RA preamble does not include data other than the preamble. This is to minimize the loss at the time of collision.

On the other hand, in the embodiment, since the RA preamble is transmitted by applying the RACH configuration (namely the reception beam), the possibility of collision is reduced. Therefore, as the RA preamble used in the embodiment, in addition to a conventional signal which is formed only by a signal sequence, a signal formed by a signal sequence and a payload area capable of notifying of a data bit may be used. Furthermore, as the RA preamble, a signal formed only by a payload area capable of notifying a data bit may be used.

FIG. 10 illustrates a configuration of an RA preamble in a case where the RA preamble is formed by a signal sequence and a payload area. For example, data of the payload area of a certain UE is multiplexed with data of other UEs with any one of CDM, TDM, and FDM or any combination thereof (including the all).

In this manner, the RA preamble includes the payload area, so that explicit signaling or UL data transmission can be performed by using the RA preamble.

Second Embodiment

Next, a second embodiment will be described. In the second embodiment, the UE does not wait for a RACH response but performs plural times of transmission of a RACH preamble on the basis of a configured transmission resource pattern. The eNB performs respective times of reception of the RACH preamble by applying different reception beam forming.

The eNB and the UE may have the functions in the second embodiment in addition to the functions in the first embodiment or may not have the functions in the first embodiment but have the functions according to the second embodiment. Hereinafter, it is assumed that the eNB and the UE have the functions in the second embodiment in addition to the functions in the first embodiment and can switch which function is to be used. In the following description, it is assumed that the eNB and the UE have the functions described in the first embodiment.

In the second embodiment, furthermore, a RACH transmission pattern which is a pattern of the case in which the UE performs plural times of transmission of the RACH preamble is defined, and the UE retains the RACH transmission pattern. For example, the RACH transmission pattern may be preconfigured in the UE or may be notified from the eNB to the UE by using broadcast information, upper layer signaling, or the like. In addition, the eNB may notify (configure) a plurality of RACH transmission patterns to the UE as the RACH transmission pattern, and the UE may select and use one RACH transmission pattern among the plurality of RACH transmission patterns. As the plurality of RACH transmission patterns, for example, there are a plurality of RACH transmission patterns such as a pattern of N times of transmission and (N+X) times of RACH transmission pattern. N is an integer of 2 or more, and X is an integer of 1 or more.

The RACH transmission pattern includes, for example, RACH configurations used for RACH preamble transmission of the respective times. As an example, in a case where the RACH transmission pattern is (RACH configuration 1, RACH configuration 2, RACH configuration 3, RACH configuration 4), the UE transmits a RACH preamble at a predetermined time interval (for example, an m subframe interval (m is an integer equal to or greater than 1)) in the order of the RACH configuration 1, the RACH configuration 2, the RACH configuration 3, and the RACH configuration 4. In addition, according to the content of the "RACH configuration", the preamble sequences of the respective times may be the same sequence or may be different sequences.

In addition, for example, in a case where the RACH configuration is represented by using time resource, in a case where the RACH transmission pattern is (RACH configuration 1, RACH configuration 2, RACH configuration 3, RACH configuration 4), the UE transmits a RACH preamble at the time (example: subframe) corresponding to each RACH configuration.

Figure 11:
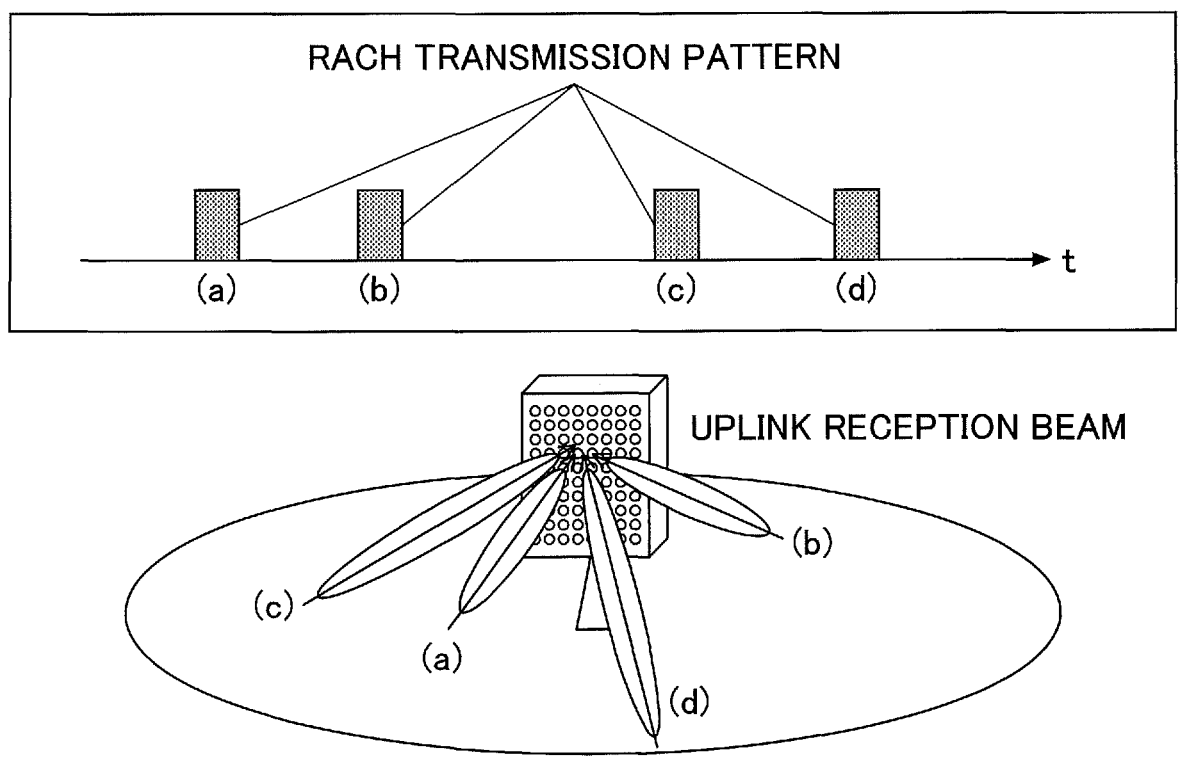
FIG. 11 is a diagram illustrating an example of a preset RACH transmission pattern.

FIG. 11 is a diagram illustrating an example of plural times of transmission of the RACH preamble in a case where the RACH configuration is represented by using a time resource as described above. Herein, if it is assumed that the RACH transmission pattern is (RACH configuration 1, RACH configuration 2, RACH configuration 3, RACH configuration 4), at the time illustrated in FIG. 11(a), a RACH preamble is transmitted by using the RACH configuration 1 corresponding to (a), and a RACH preamble is transmitted by using the RACH configuration 2 corresponding to (b). The same description is applied to (c) and (d). In addition, the RACH preamble transmitted by using each RACH configuration is received by using a reception beam corresponding to the RACH configuration in the eNB.

The transmission time interval may be designated by the RACH transmission pattern. For example, if it is assumed that a, b, and c are values indicating time lengths, in a case where the RACH transmission pattern is set to (RACH configuration 1: a, RACH configuration 2: b, RACH configuration 3: c, RACH configuration 4), the UE first transmits a RACH preamble by using the RACH configuration 1 and, after the time a, the UE transmits a RACH preamble by using the RACH configuration 2. The same description is applied to b and c.

<Sequence Example>

Figure 12:
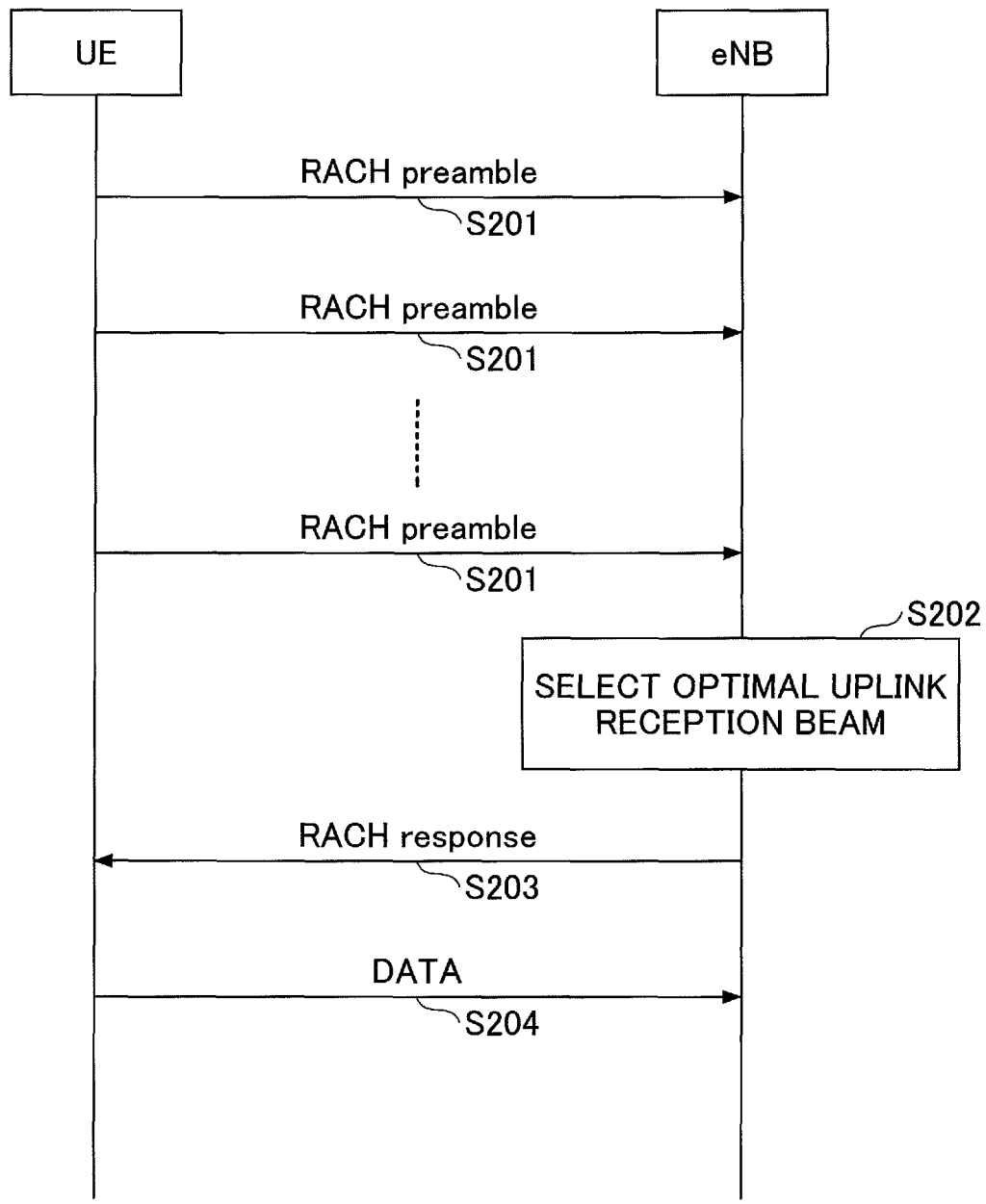
FIG. 12 is a diagram for explaining a random access procedure in a second embodiment.

Contents of the processing in the second embodiment will be described more in detail along the sequence illustrated in FIG. 12.

In step S201, the UE performs plural times of transmission of a RACH preamble according to a configured RACH transmission pattern.

In step S202, the eNB specifies an uplink reception beam (RACH configuration) which has been used to successfully receive the RACH preamble. Herein, in a case where the reception succeeds by using a plurality of uplink beams, the eNB specifies, for example, an uplink reception beam having the highest reception level.

In step S203, the eNB transmits a RACH response including the index of the RACH configuration, for example, specified in step S202 (that is, the index of the uplink reception beam) to the UE. At this time, the RACH response may be transmitted to the UE by using the (reverse) downlink transmission beam corresponding to the uplink reception beam specified in step S202.

After that, transmission and reception of data between the UE and the eNB are performed. At this time, the eNB can use the uplink reception beam specified in step S202 with respect to the uplink data reception of the UE. In addition, the eNB can use the downlink beam used in step S203 with respect to the data transmission to the UE.

<Detailed Example>

With respect to step S201 described above, the UE applies plural times of transmission irrespective of its own coverage state (downlink radio communication quality). However, as described below, according to the downlink wireless communication quality (reception level, reception quality, or the like), the UE may change the RACH transmission pattern.

In this case, for example, in a case where the downlink radio quality is equal to or higher than a predetermined threshold value, the RACH transmission pattern of N times of transmission may be selected, and in a case where the downlink radio quality is lower than the predetermined threshold value, the RACH transmission pattern of (N+X) times of transmission may be selected. Herein, X is the number of times depending on radio quality, and the value of X in a case where the radio quality is low is larger than the value of X in a case where the radio quality is high.

In addition, before the step S201, the eNB may notify the UE of whether or not plural times of transmission of the RACH preamble is to be performed by using a broadcast signal. In a case where it is notified that plural times of transmission of the RACH preamble is not to be performed, the UE and the eNB perform the operations described in the first embodiment. On the other hand, in a case where it is notified that plural times of transmission of the RACH preamble is to be performed by using the broadcast signal, the UE and the eNB perform the operations described in the second embodiment. In addition, in a case where the RACH transmission pattern is notified from the eNB to the UE, this may denote that the plural times of transmission of the RACH preamble transmission is to be performed. According to the configuration, it is possible to switch between the operation of the first embodiment and the operation of the second embodiment.

With respect to the transmission power in the plural times of transmission of the RACH preamble, for example, the UE determines the transmission power on the basis of the beam having the highest reception level as a result of measurement of the beam selection signal and use the transmission power commonly among the transmissions of the RACH preamble (excluding during the power ramping).

The above-described measurement is, for example, measurement in each downlink beam (downlink resource) corresponding to the RACH configuration in the RACH transmission pattern to be used. Determining the transmission power on the basis of the beam corresponds to calculating the transmission power on the basis of path loss or the like in the beam. The eNB selects an uplink reception beam with respect to the RACH preamble having the highest reception level among the plural times of reception of the RACH preamble.

For example, the eNB can reflect the selected uplink reception beam on a reception time window (transmission time window as viewed from the eNB). In this case, for example, the correspondence information between the reception time window and the beam index (that is, the uplink resource) is preconfigured in the UE, the UE performs the next data transmission by using the uplink resource corresponding to the time window in which the RACH response is received, and the eNB can receive the transmission data from the user by using the uplink reception beam.

In addition, the eNB may transmit a RACH response to the UE by using control information including information corresponding to the selected uplink reception beam or by using a CRC mask bit including information corresponding to the selected uplink reception beam. By detecting the information corresponding to the uplink reception beam from the RACH response, the UE can perform uplink data transmission by using the resource corresponding to the uplink reception beam.

With respect to the plural times of transmission in step S201, for example, in a case where the UE detects that a reception level of a signal from the eNB (for example, a beam selection signal having the highest reception level) is equal to or higher than the predetermined threshold value, transmission may be performed by using the configured RACH transmission pattern once, and in a case where the reception level is equal to or lower than the predetermined threshold value, transmission may be performed by using the RACH transmission pattern plural times. Even in a case where the plural times of transmission of the RACH transmission pattern is performed, the transmission power is constant.

In a case where transmission is performed by using the RACH transmission pattern once, in a case where a RACH response cannot be received, power ramping is performed, and transmission of the RACH transmission pattern is performed once again. After that, this operation is performed until the RACH response can be received.

In a case where the plural times of transmission of the RACH transmission pattern is performed, after the time when a RACH response can be received, the transmission of the RACH transmission pattern is stopped.

<Changing of Beam Selection in UE Side>

In the second embodiment, for example, by transmitting a RACH transmission pattern plural times while performing power ramping, in a case in which the transmission power reaches the maximum transmission power of the UE, in a case in which the number of times of transmission exceeds the predetermined number of times of transmission, or in a case in which the result of measurement for downlink is changed, the UE may change the RACH configuration (that is, the beam index selected in the UE side).

The predetermined number of times of transmission described above may be a threshold of the number of times of transmission of the RACH preamble or a threshold of the number of times of transmission of the RACH transmission pattern. Furthermore, a case where the result of measurement for the downlink changes is, for example, a case where the highest reception level among the downlink beams (downlink resources) corresponding to the RACH configurations in the RACH transmission pattern which is to be used is equal to or lower than the predetermined threshold value.

Figure 13:
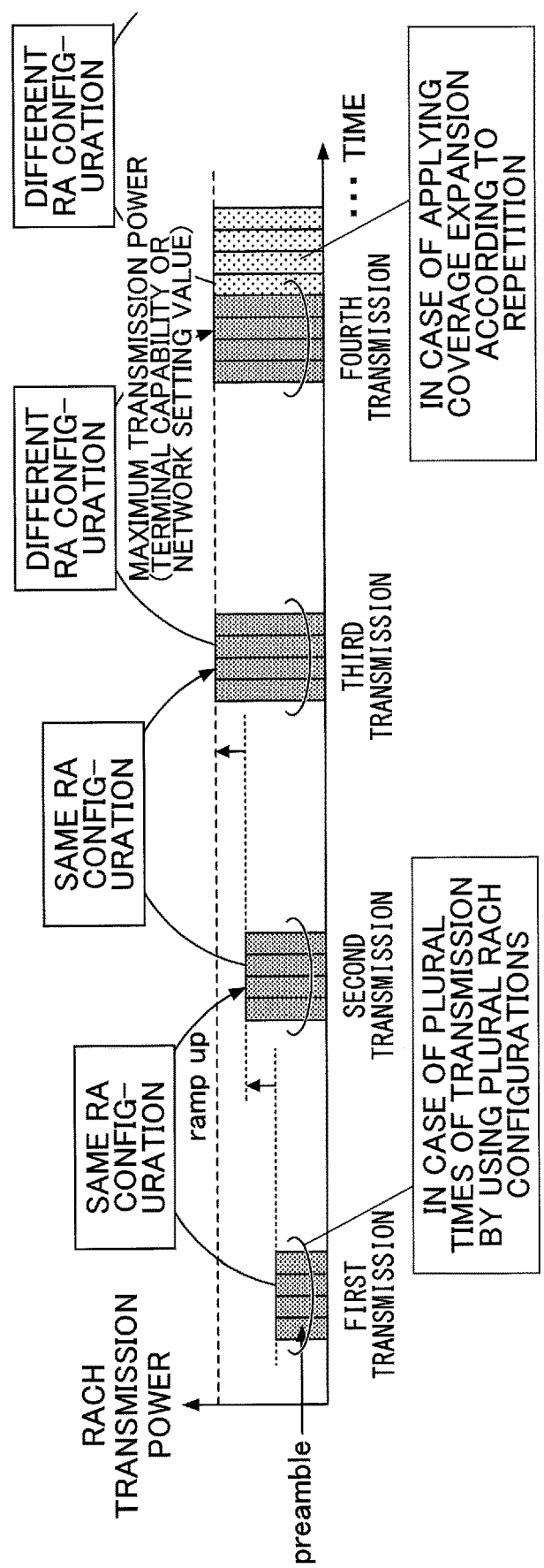
FIG. 13 is a diagram for explaining an example of a RACH configuration changing operation.

FIG. 13 illustrates an example of changing the RACH configuration for transmitting a RACH preamble. In the example of FIG. 13, until the transmission power of the UE reaches a predetermined threshold (maximum transmission power determined according to UE capability or a network configuration value), the UE transmits a RACH preamble by using the same RACH transmission pattern (set of RACH configurations). And after that, until the number of times of transmission reaches the maximum number of times of transmission, the UE transmits a RACH preamble by using a RACH transmission pattern (set of RACH configurations) different from that in the previous transmission.

More specifically, in the example of FIG. 13, up to the third transmission of the RACH transmission pattern where the transmission power reaches the maximum transmission power by power ramping, the same RACH transmission pattern (for example, a set of RACH configurations 1 to 4) is used. Next, in the fourth transmission, a different RACH transmission pattern (for example, a set of RACH configurations 5 to 8) different from that of the third transmission is used. In the example of FIG. 13, different RACH transmission patterns are transmitted twice in order to expand the coverage in the fourth transmission.

By performing RACH resource reselection (beam selection) as described above, particularly in a case where the reception beams of the eNB are different for each RACH configuration, there is a possibility that a higher beam forming gain is obtained.

Besides the processing as illustrated in FIG. 13, in a case where the RACH configuration is changed in the UE side, the power ramping may be reset. As a result, it is possible to avoid RACH preamble transmission with excessive transmission power.

In addition, every time RACH preamble transmission is performed, for example, the UE may perform measurement of a beam selection signal (synchronization signal, reference signal, or the like), and the UE may re-select the RACH configuration (beam index) which is to be transmitted next on the basis of the result of measurement. Furthermore, when the RACH configuration is changed (for example, the fourth transmission illustrated in FIG. 13), the UE may select a set of RACH configurations by sequentially selecting a RACH configuration (beam index) having a high reception level (reception quality) obtained from the result of measurement. By such an operation, it is possible to more reliably change the RACH configuration (to change the beam)

In addition, in a case where the UE has a plurality of transmission antennas, the UE may switch transmission precoding every time a RACH preamble is transmitted or every time transmission power is ramped up. For example, a precoding index may be cyclically switched, or the UE may apply arbitrary precoding. By such an operation, it is possible to obtain a transmission diversity gain.

Figure 14:
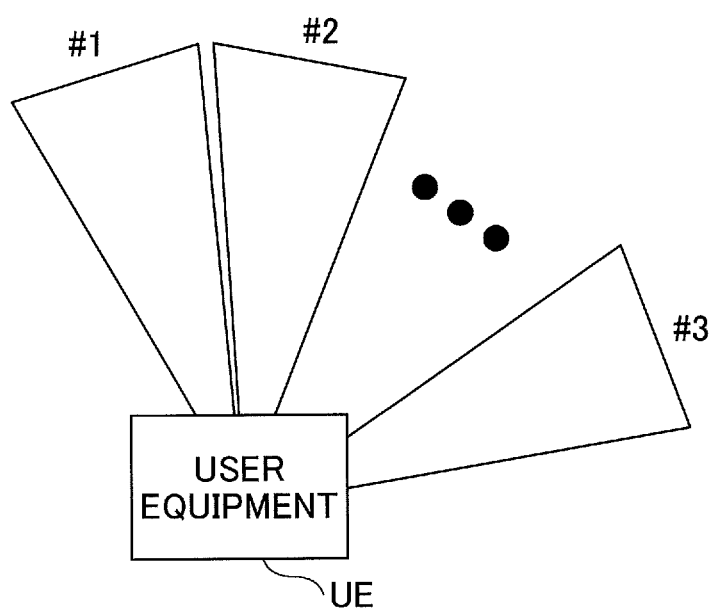
FIG. 14 is a diagram illustrating an example in a case where a user equipment UE switches transmission precoding.

FIG. 14 illustrates an example of a case where the UE switches the transmission precoding. For example, the UE performs switching such that, first, the UE uses transmission precoding in which a transmission beam of #1 is formed, and next, if a switching trigger (RACH preamble transmission, Ramp up) occurs, the UE performs transmission by using a transmission beam of #2.

As described above, according to the second embodiment, the eNB can select an optimal uplink reception beam by receiving the RACH preamble. In addition, when the eNB receives transmission data from the UE corresponding to the RACH response, it is possible to apply the optimal reception beam. Furthermore, it is also possible to reduce the overhead and delay caused by the plural times of transmission due to the beam diversity effect.

Particularly, in the case of FDD, since the channel characteristics of the uplink and downlink are independent, there are cases where RACH transmission is required in a state of no uplink channel information. The second embodiment is particularly suitable for such a case.

Furthermore, similarly to the first embodiment, the UE selects a downlink beam index, selects a RACH configuration corresponding to the selected downlink beam index, and transmits a RACH preamble by the selected RACH configuration, so that it is possible to simultaneously perform the downlink beam selection.

Modified Example

In the following, as a modified example which can be applied to both (one for some) of the first embodiment and the second embodiment, a configuration example associated with RACH response (herein, referred to as RAR), a configuration example associated with TA (Timing Advance), and a configuration example associated with a search space will be described.

<RAR>

In a case where the eNB simultaneously detects RACH preambles from a plurality of UEs, it is possible to aggregate RARs to each UE and transmit the aggregated RARs at one time. On the other hand, in the embodiment, the eNB can select downlink beams suitable for each UE and can transmit an RAR by using the respective downlink beams. Herein, since respective downlink beams are transmitted by using, for example, different time and frequency resources, in the case of aggregating and transmitting RARs of a plurality of UEs, it is not preferable to mix UEs of different downlink beams.

Figure 15:
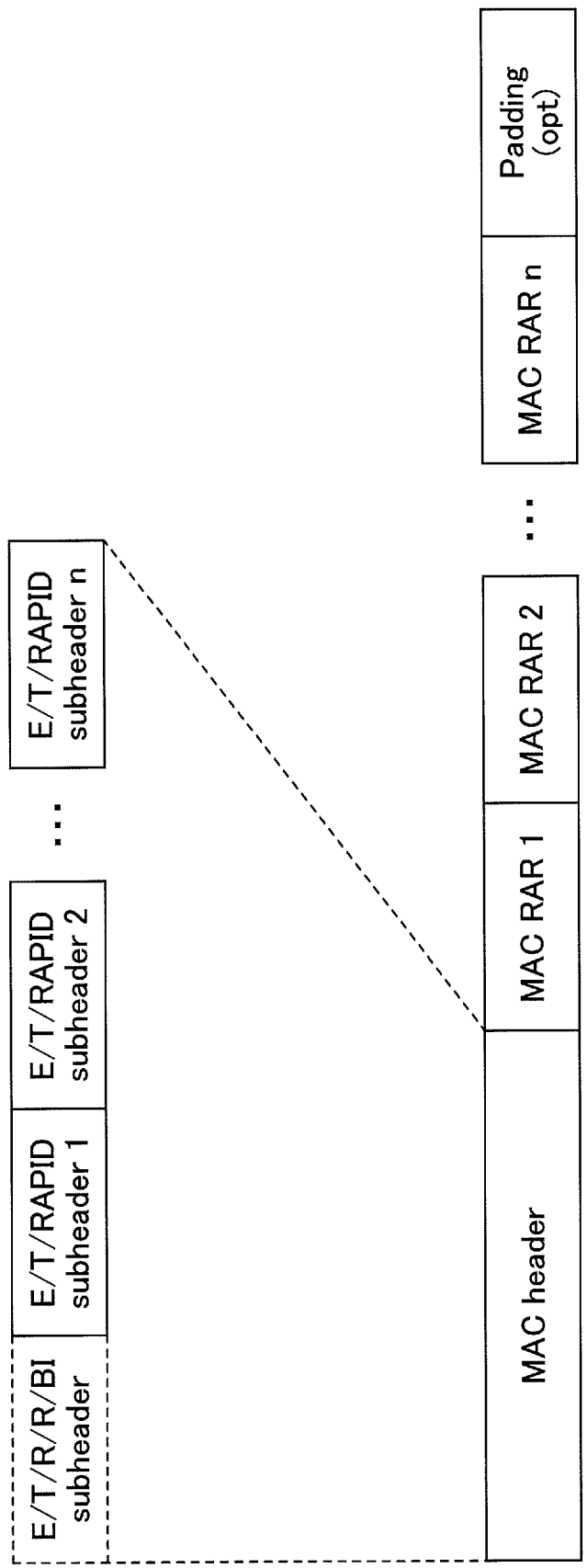
FIG. 15 is a diagram illustrating an example of a MAC PDU including a plurality of RARs.

Therefore, in the modified example, among a plurality of aggregatable RARs, the eNB aggregates RARs associated with the same selected downlink beam and transmits the aggregated RARs by including the RARs in the same MAC PDU. In a case where a plurality of downlink beams are different from each other, a MAC PDU including a single RAR is transmitted. An example of a MAC PDU including a plurality of RARs is illustrated in FIG. 15. In the example of FIG. 15, RAR 1 to RAR n are transmitted by using the same downlink beam. According to such processing, it is possible to efficiently perform RAR transmission by using an optimal downlink beam.

On the other hand, the RAR is transmitted by being mapped to a CSS (Common Search Space) in a PDCCH. Regarding this point, in the modified example, the CSS by which RARs are to be transmitted may be divided into a plurality of subsets, and different beam indexes may be associated with respective subsets.

Figure 16A:
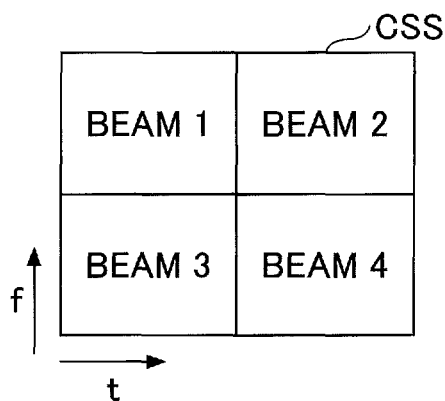
FIG. 16A is a diagram illustrating an example of division of a CSS/reception Window into subsets.

An example is illustrated in FIG. 16A. In this example, the CSS is divided into four subsets, which are associated with beam 1, beam 2, beam 3, and beam 4, respectively. This correspondence information is notified to the UE by, for example, a broadcast signal, upper layer signaling, or the like.

For example, in a case where the eNB transmits, for example, an RAR of a certain UE by using beam 1, the eNB maps the RAR of the UE to an area of the CSS corresponding to beam 1 and transmits the RAR. The UE can recognize that the RAR has been transmitted by using beam 1 by detecting its own RAR in the associated area. Therefore, for example, in the second embodiment, the UE can recognize which RACH configuration (beam index) transmitted by the UE was optimal. In addition, in the UE side, reception beam forming can also be applied with respect to the RAR.

Figure 16B:
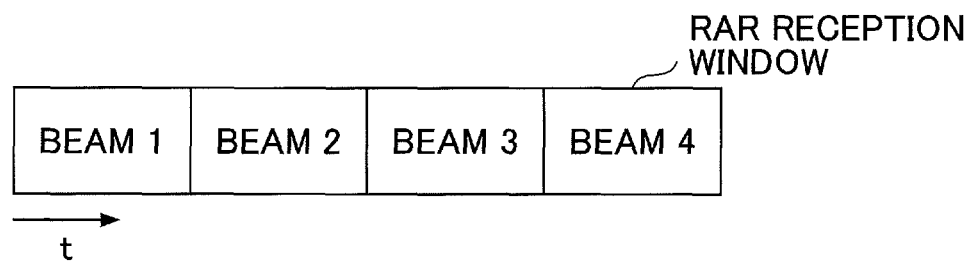
FIG. 16B is a diagram illustrating an example of division of a CSS/reception Window into subsets.

Instead of or in addition to dividing the CSS into the subsets as described above, a reception window of the RAR is divided into a plurality of subsets, and similarly to the case of the CSS, the subsets and beam indexes may be associated with each other. An example of this case is illustrated in FIG. 16B.

Furthermore, RNTIs (for example, TC-RNTI) used for CRC masking may be associated with beam indexes (or groups). Namely, for example, it is considered that a value of a predetermined bit of an RNTI is set as a beam index.

In addition, in a case where the eNB succeeds in receiving a RACH preamble by a plurality of RACH configurations with respect to a single UE, the eNB may include information (for example, a plurality of beam indexes corresponding to the RACH configurations by which reception succeeds) indicating that fact in an RAR addressed to the UE, and transmit the RAR. In addition, information of the beam indexes may be included in the RAR in the order of RACH preamble reception levels. Accordingly, the UE can recognize the order of the qualities of the respective beam indexes.

In addition, the eNB may include information (beam index or the like) of a RACH configuration by which reception succeeds in an RAR, or in a shared field of a plurality of RARs of MAC PDUs which transmit RARs (MAC Header or the like illustrated in FIG. 15), and transmit the RAR. This configuration is suitable for a case where the uplink beam index and the downlink beam index are independent like the case of using, for example, FDD.

<TA>

In the communication system according to the embodiment based on the LTE, the eNB adjusts transmission timing of an uplink signal of each UE and performs control so that a shift of reception timing in the eNB falls within a predetermined time. Specifically, the eNB measures a difference between a desired uplink signal reception timing and an actual uplink signal reception timing with respect to each UE and instructs the UE to shift the uplink signal timing forward by the difference. This instruction is performed, for example, by a TA (Timing Advance) command (TA value) included in the RAR at the time of the RA procedure.

In order to cover a wide area cell, support of a wide range of TA values is necessary, and a signaling overhead for the TA is large (11 bits in existing LTE).

Figure 17:
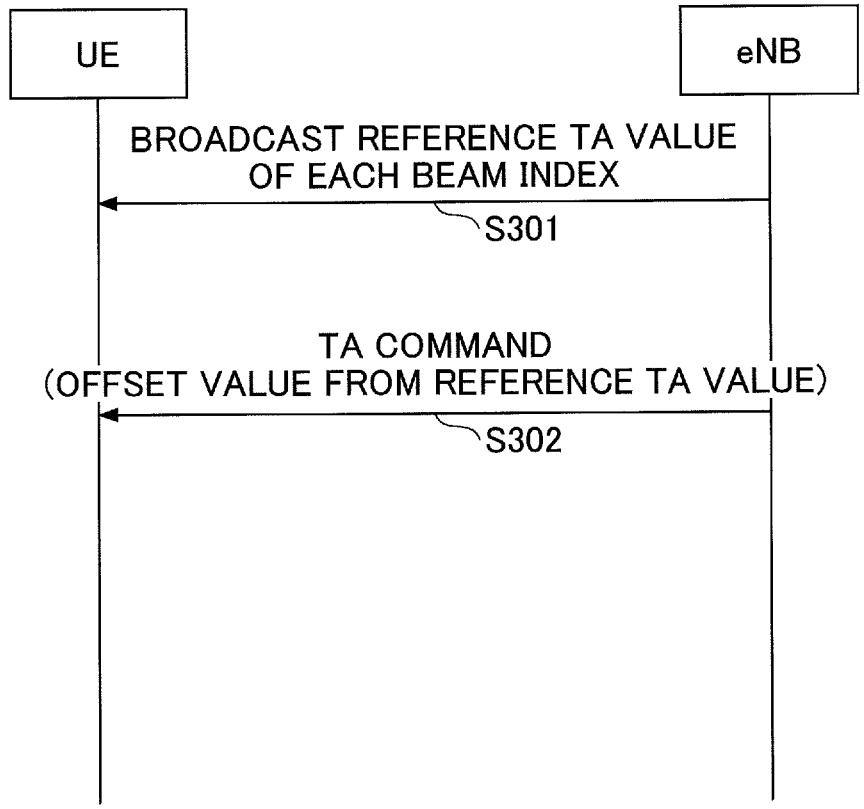
FIG. 17 is a diagram illustrating a signaling sequence associated with TA.

Therefore, in the modified example, as illustrated in FIG. 17, the eNB notifies the UE of a reference TA value for each downlink beam index (step S301), and notifies of an offset value for the reference TA value by using a TA command (Step S302). An area which each beam can reach may be considered to be a small cell, and the offset value for covering the area can be a value in a small range.

The notification of a reference TA value may be performed by using a broadcast signal or may be performed by using upper layer signaling. Furthermore, the reference TA value may be included in the above-described correspondence information A in correspondence with each respective beam index. Separately from the correspondence information A, the reference TA value and the beam index may be notified as a list where the reference TA value and the beam index are associated with each other.

Figure 18:
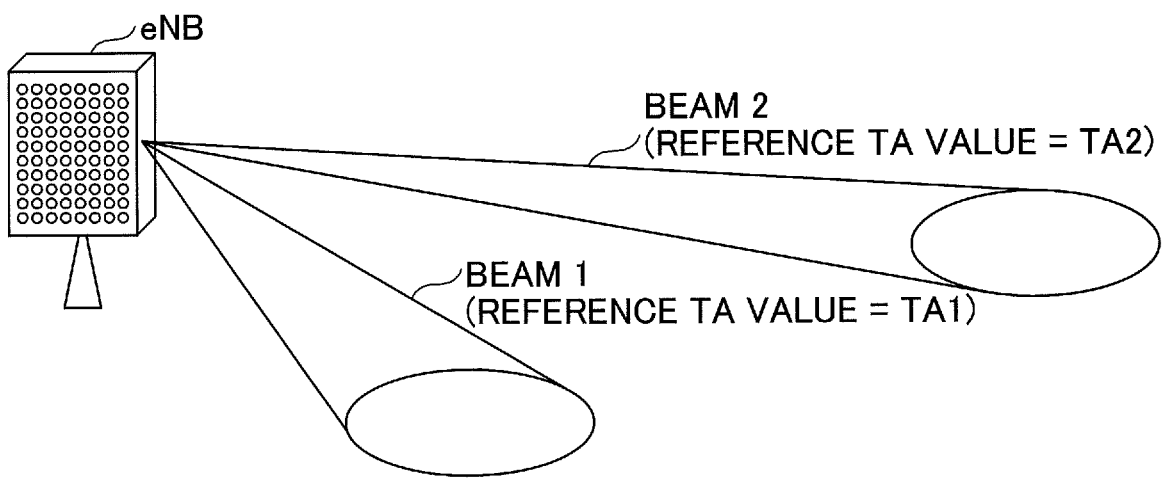
FIG. 18 is a diagram for explaining a reference TA value.

An example is illustrated in FIG. 18. In the example of FIG. 18, TA 1 is notified as a reference TA value with respect to the beam 1, and TA 2 is notified as a reference TA value with respect to the beam 2. Then, within the areas for the respective beams, offset values for the respective reference TA values are notified as TA commands to the respective UEs.

For example, in the case of a narrow beam, the TA command in the RAR may be removed. Also, the range of the TA command may be reduced.

As described above, in the case of aggregating and transmitting RARs of the same downlink beam (including the case of one RAR), TAs which are to be notified by using MAC PDUs transmitting RARs may be divided into reference TA values between the RARs and offset TA values for each RAR, and they may be transmitted. For example, the reference TA values are transmitted by using the MAC header, and the offset TA values of each UE are included in the corresponding RARs. Accordingly, in a case where the length of the reference TA value is 7 bits and the length of the offset TA value is 4 bits, overhead of (N−1)×7 bits can be reduced by multiplexing of N RARs.

In addition, the eNB may broadcast a relative value with respect to a reference time (UTC time) of synchronization timing or the like, and the UE that has acquired the reference time by using the GNSS or the like may autonomously apply the TA. In this case, the TA command by using the RAR may be removed, or the range of the TA command may be reduced.

According to the operation of the modified example as described above, the signaling overhead can be reduced. In addition, the TA command may be removed.

In addition, effective TA is possible by using correlation between beams and TA values. Furthermore, effective TA is possible by using similarity of TA values among RARs transmitted by using the same MAC PDU due to correspondence between beams and RAR reception resource/search spaces and the like.

<Search Space>

A search space where the UE monitors RAR, contention resolution (message 4), or the like may be a UE common search space, a UE group search space, or a UE specific search space.

For example, the UE that has selected a certain beam index (RACH configuration) monitors only the UE group search space corresponding to that beam, so that it is possible to omit unnecessary monitoring and prevent erroneous recognition of control information between the beams. Each of the areas illustrated in FIG. 16A is an example of the UE group search space. In addition, the UE common search space is effective in a case where it is difficult to limit the search space, in a case where the beam selection is not performed, a case where the beam is changed and retransmitted, and the like.

(Equipment Configuration)

Next, a configuration example of the UE and the eNB in the embodiments (including the first and second embodiments and the modified example) of the present invention will be described.

<User Equipment UE>

Figure 19:
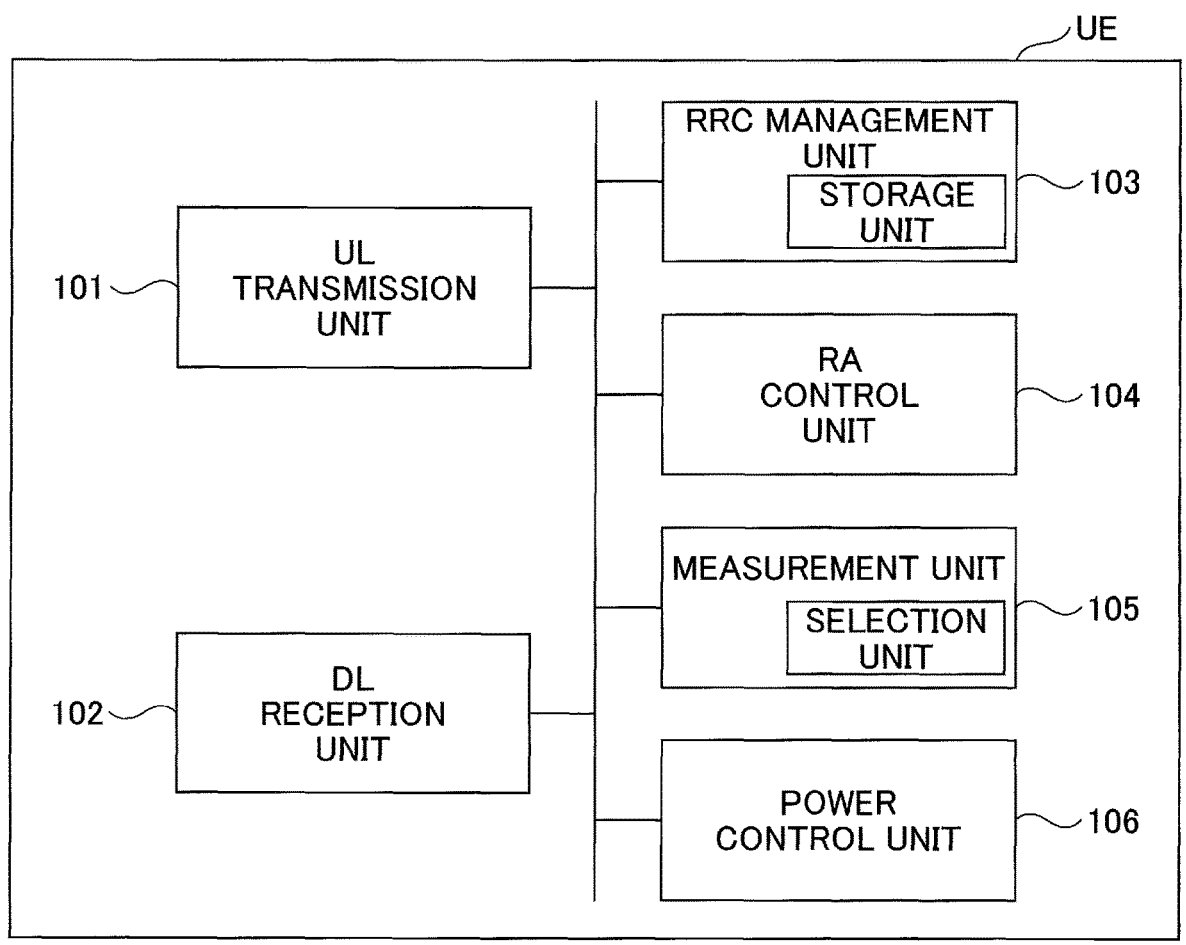
FIG. 19 is a configuration diagram of a user equipment UE.

FIG. 19 illustrates a functional configuration diagram of the UE. As illustrated in FIG. 19, the UE includes an UL transmission unit 101, a DL reception unit 102, an RRC management unit 103, an RA control unit 104, a measurement unit 105, and a power control unit 106. FIG. 19 illustrates only functional units particularly associated with the present invention in the UE, and the UE also has a function (not shown) for performing at least operation in accordance with LTE.

The UL transmission unit 101 has a function of generating various signals of a physical layer from information of upper layers which is to be transmitted from the UE and transmitting the signals to the eNB. The DL reception unit 102 has a function of receiving various downlink signals from the eNB and acquiring information of an upper layer from the received signals of the physical layer. In addition, the UL transmission unit 101 and the DL reception unit 102 also have functions of performing processing associated with the TA described in the modified example.

The RRC management unit 103 acquires broadcast signals, upper layer signals, and the like from the eNB through the DL reception unit 102, acquires configuration information such as correspondence information and pattern information from the broadcast signals, upper layer signals, and the like signals, and stores the configuration information.

The RA control unit 104 generates each signal in the random access procedure described in the first and second embodiments and the modified example, and also performs control of signal transmission and reception in the random access through the UL transmission unit 101 and the DL reception unit 102, respectively. This control is performed on the basis of the configuration information such as correspondence information and the pattern information stored in the RRC management unit 103.

The measurement unit 105 has a function of measuring the reception level or the like of the signal received from the eNB and selecting a beam (for example, selecting a RACH configuration) on the basis of the result of measurement. Namely, the measurement unit 105 includes a selection unit. The power control unit 106 controls transmission power of the signal transmitted from the UL transmission unit 101.

With respect to the configuration of the UE illustrated in FIG. 19, the UE may be realized entirely by a hardware circuit (for example, one or a plurality of IC chips), or the UE may be realized by configuring a portion thereof by a hardware circuit and configuring the other portions by a CPU and a program.

Figure 20:
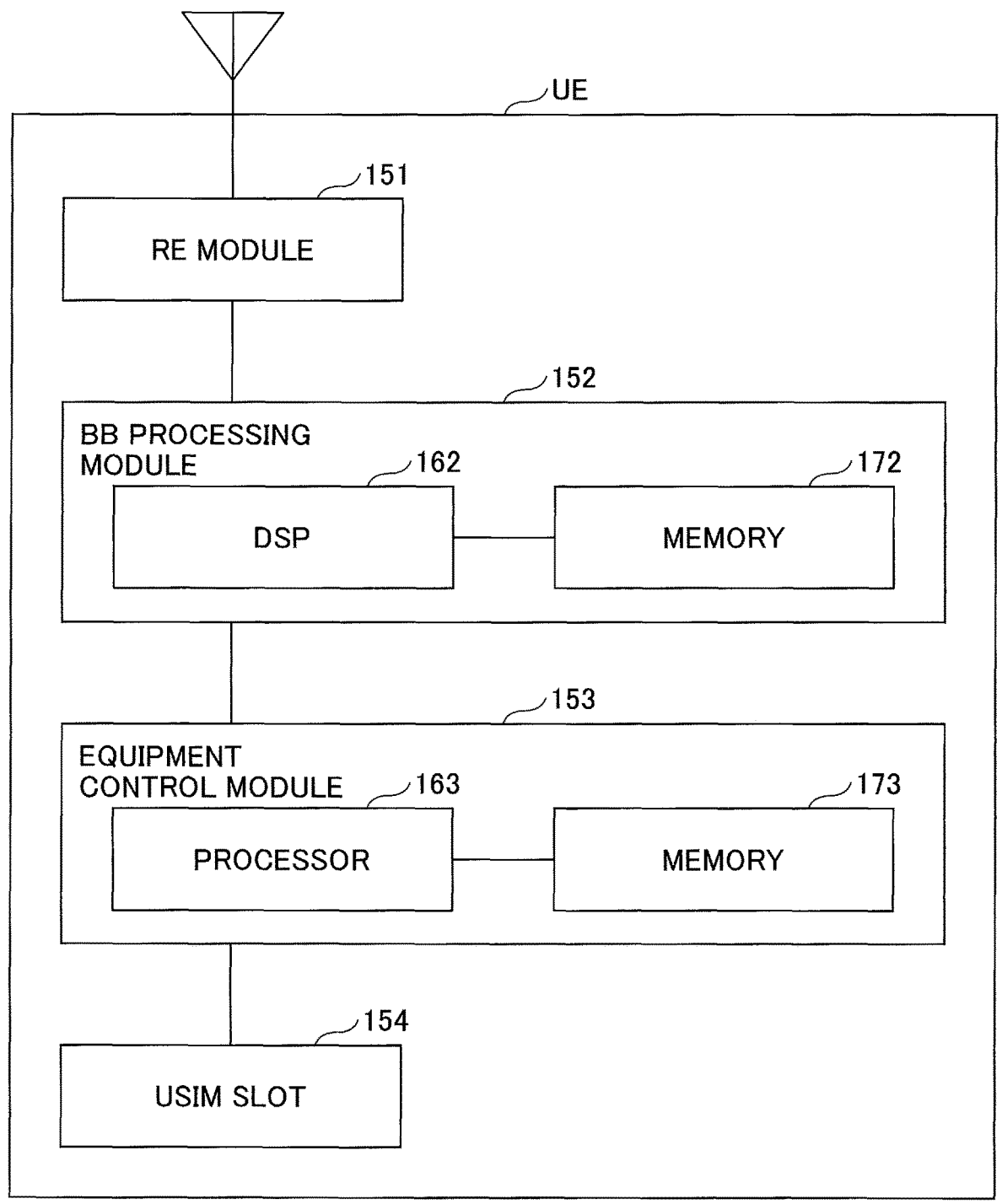
FIG. 20 is a HW configuration diagram of a user equipment UE.

FIG. 20 is a diagram illustrating an example of a hardware (HW) configuration of the UE. FIG. 20 illustrates a configuration more similar to an implementing example than FIG. 19. As illustrated in FIG. 20, the UE includes an RE (Radio Equipment) module 151 which performs processing associated with radio signals, a BB (Base Band) processing module 152 which performs baseband signal processing, an equipment control module 153 performing processing of the upper layer and the like, and a USIM slot 154 which is an interface for accessing the USIM card.

The RE module 151 generates a radio signal which is to be transmitted from the antenna by performing D/A (Digital-to-Analog) conversion, modulation, frequency conversion, power amplification, and the like on the digital baseband signal received from the BB processing module 152. In addition, the RE module generates the digital baseband signal by performing frequency conversion, A/D (analog to digital) conversion, demodulation, and the like on the radio signal received from the antenna and transfers the digital baseband signal to the BB processing module 152. For example, the RE module 151 has the functions of the physical layer and the like in the UL transmission unit 101 and the DL reception unit 102 in FIG. 19.

The BB processing module 152 performs a process of mutually converting the IP packet and the digital baseband signal. A DSP (Digital Signal Processor) 162 is a processor which performs signal processing in the BB processing module 152. A memory 172 is used as a work area of the DSP 162. For example, the BB processing module 152 includes the functions of the layer 2 and the like in the UL transmission unit 101 and the DL reception unit 102 in FIG. 19, the RRC management unit 103, the RA control unit 104, the measurement unit 105, and the power control unit 106. All or a portion of the functions of the RRC management unit 103, the RA control unit 104, the measurement unit 105, and the power control unit 106 may be included in the equipment control module 153.

The equipment control module 153 performs IP layer protocol processing, various application processing, and the like. A processor 163 is a processor which performs processing which is to be performed by the equipment control module 153. A memory 173 is used as a work area of the processor 163. In addition, the processor 163 performs reading and writing data with respect to the USIM through the USIM slot 154.

<Base Station eNB>

Figure 21:
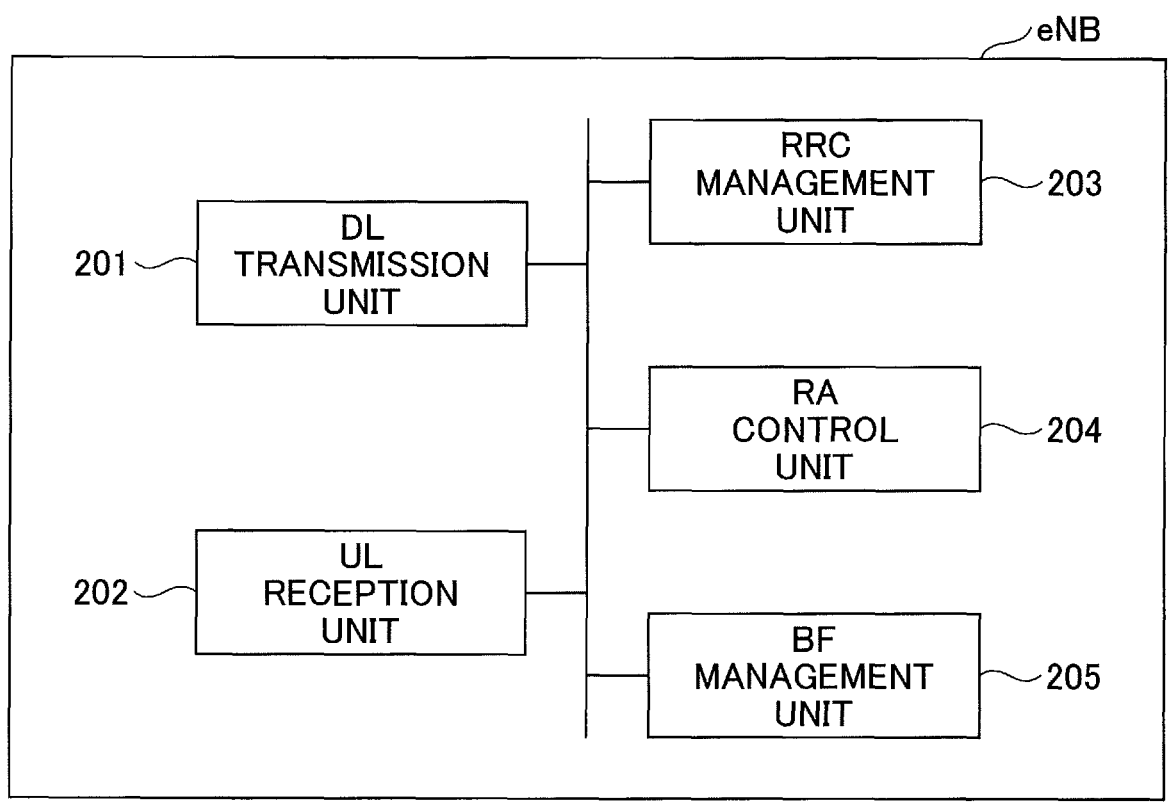
FIG. 21 is a configuration diagram of a base station eNB.

FIG. 21 illustrates a functional configuration diagram of the eNB. As illustrated in FIG. 21, the eNB includes a DL transmission unit 201, an UL reception unit 202, an RRC management unit 203, an RA control unit 204, and a BF management unit 205. FIG. 21 illustrates only the functional units particularly associated with the embodiment of the present invention in the eNB, and the eNB also has a function (not shown) for performing at least operation in accordance with the LTE scheme.

The DL transmission unit 201 has a function of generating various signals of the physical layer from the information of upper layers which is to be transmitted from the eNB and transmitting the signals. The UL reception unit 202 has a function of receiving various uplink signals from the UE and acquiring information of upper layers from the received signals of the physical layer. The DL transmission unit 201 and the UL reception unit 202 include a multi-element antenna and have functions of performing beam forming of various layers. Furthermore, the DL transmission unit 201 and the UL reception unit 202 include a function of performing processing associated with the TA described in the modified example.

The RRC management unit 203 has a function of generating a broadcast signal including correspondence information, pattern information, and the like, an upper layer signal, and the like, and transmitting the signal s to the UE through the DL transmission unit 201. The RA control unit 204 performs transmission and reception of signals in the random access procedure described in the first and second embodiments and the modified example through the DL transmission unit 201 and the UL reception unit 202. The BF management unit 205 manages indexes, hierarchies, and the like of the beams which are applied by the eNB.

With respect to the configuration of the eNB illustrated in FIG. 21, the eNB may be realized entirely by a hardware circuit (for example, one or a plurality of IC chips), or the eNB may be realized by configuring a portion thereof by a hardware circuit and configuring the other portions by a CPU and a program.

Figure 22:
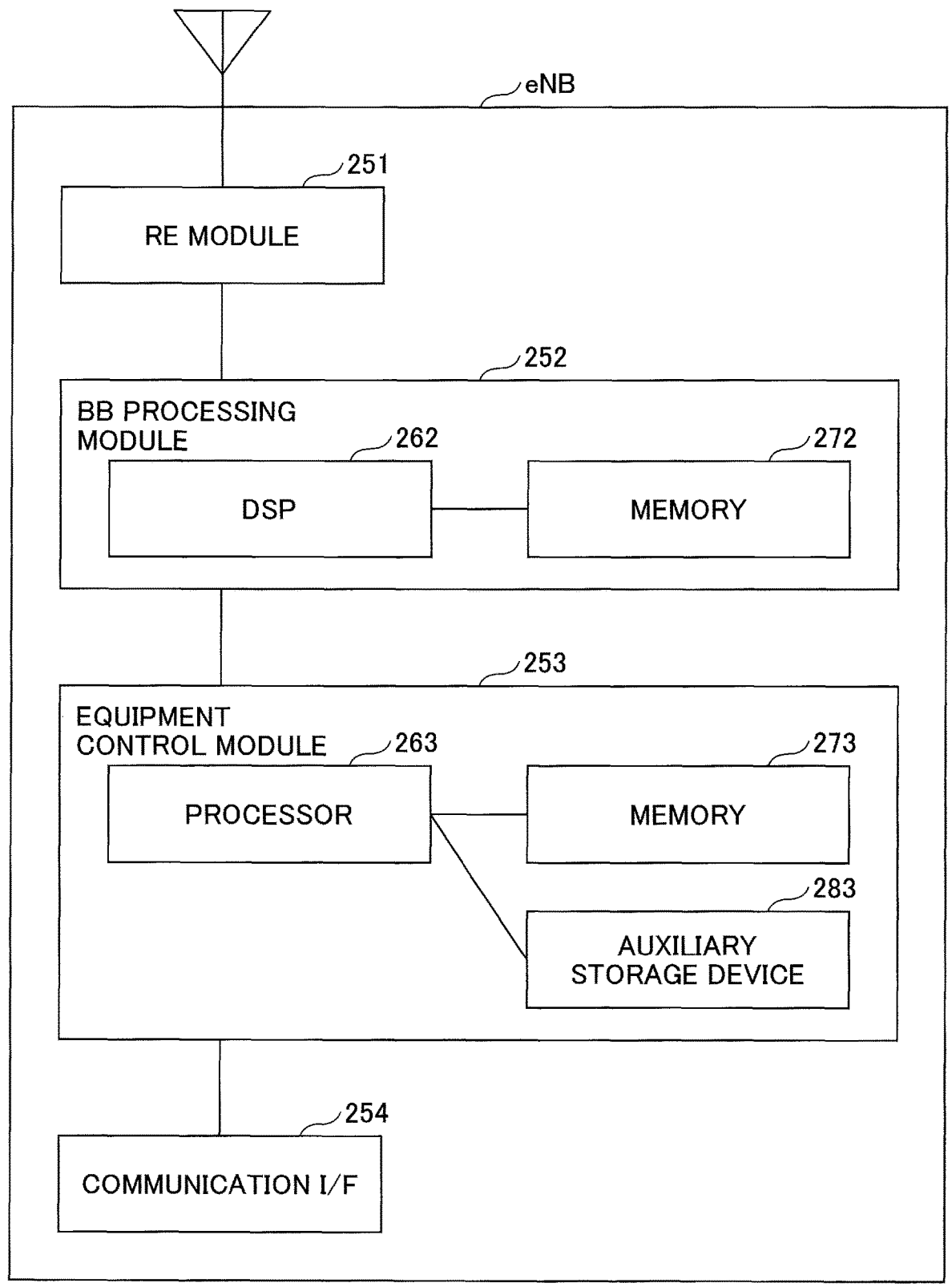
FIG. 22 is a HW configuration diagram of a base station eNB.

FIG. 22 is a diagram illustrating an example of a hardware (HW) configuration of the eNB. FIG. 22 illustrates a configuration more similar to the implementing example than FIG. 21. As illustrated in FIG. 22, the eNB includes an RE module 251 which performs processing associated with radio signals, a BB processing module 252 which performs baseband signal processing, an equipment control module 253 which performs processing such as an upper layer, and a communication IF 254 which is an interface for connection to the network.

The RE module 251 generates a radio signal which is to be transmitted from the antenna by performing D/A conversion, modulation, frequency conversion, power amplification, and the like on the digital baseband signal received from the BB processing module 252. In addition, the RE module generates the digital baseband signal by performing frequency conversion, A/D conversion, demodulation, or the like on the radio signal received from the antenna and transfers the digital baseband signal to the BB processing module 252. For example, the RE module 251 has the functions of the physical layer and the like in the DL transmission unit 201 and the UL reception unit 202 in FIG. 21. The antenna of the eNB is a multi-element antenna capable of forming the transmission beams and the reception beams of various layers.

The BB processing module 252 performs a process of mutually converting the IP packet and the digital baseband signal. The DSP 262 is a processor which performs signal processing in the BB processing module 252. A memory 272 is used as a work area of the DSP 252. The BB processing module 252 includes, for example, functions of the layer 2 and the like in the DL transmission unit 201 and the UL reception unit 202 in FIG. 21, an RRC management unit 203, an RA control unit 204, and a BF management unit 205.

All or a portion of the functions of the RRC management unit 203, the RA control unit 204, and the BF management unit 205 may be included in the equipment control module 253.

The equipment control module 253 performs IP layer protocol processing, OAM processing, and the like. A processor 263 is a processor which performs processing performed by the equipment control module 253. A memory 273 is used as a work area of the processor 263. An auxiliary storage device 283 is, for example, an HDD or the like and stores various setting information and the like for the base station eNB itself to operate.

The configuration (function classification) of the devices illustrated in FIGS. 19 to 22 is just an example of a configuration for realizing the processing described in the embodiment (including the first and second embodiments and the modified example). As long as the processing described in the embodiment (including the first and second embodiments and the modified example) can be realized, the implementing method (arrangement, names, or the like of specific functional units) thereof is not limited to the specific implementing method.

Summary of Embodiments

According to the technique disclosed in the present application described above, there is provided a user equipment communicating with a base station in a wireless communication system including the base station and the user equipment, the user equipment including: a storage unit which stores correspondence information where an identifier of a beam formed by the base station and configuration information used for transmission of a random access signal are associated with each other; a selection unit which selects a specific beam on the basis of reception quality of signals transmitted from the base station by using a plurality of different beams and selects the configuration information corresponding to the specific beam on the basis of the correspondence information; and a transmission unit which transmits the random access signal to the base station by using the configuration information selected by the selection unit.

According to the above-described configuration, in the random access performed between the user equipment and the base station, the base station can appropriately apply the beam.

In the correspondence information, a plurality of identifiers of beams may be associated with one piece of configuration information. According to the configuration, the base station can receive the random access signal by using a wider beam.

In the correspondence information, a plurality of pieces of configuration information may be associated with one identifier of beam. According to the configuration, it is possible to reduce collision probability among a plurality of user equipments that select the same beam.

The configuration information may include transmission power information, and the transmission unit may transmit the random access signal by using transmission power based on the transmission power information. According to the configuration, it is possible to avoid an increase in power ramping.

The beam formed by the base station has a hierarchical structure, and the selection unit selects the specific beam in the specific hierarchy on the basis of a predetermined criterion, and the selection unit selects the configuration information corresponding to a specific beam on the basis of the correspondence information. According to the configuration, for example, a beam of an appropriate hierarchy can be selected according to the state of the user equipment, and the possibility of beam selection error can be reduced.

In addition, according to the disclosed technique, there is provided a user equipment communicating with a base station in a wireless communication system including the base station and the user equipment, the user equipment including: a storage unit which stores a transmission pattern having a plurality of pieces of configuration information which are to be used for transmission of a random access signal and are associated with beams formed by the base station; and a transmission unit which transmits the random access signal plural times by using each configuration information in the transmission pattern without waiting for a random access response.

According to the above-described configuration, in the random access performed between the user equipment and the base station, the base station can appropriately apply the beam.

The user equipment may further include a reception unit which receives from the base station information indicating whether or not an operation of transmitting the random access signal plural times is performed, and in a case where the reception unit receives the information indicating that the operation is not performed, the user equipment may select a specific beam on the basis of reception quality of signals transmitted by using a plurality of different beams from the base station and transmit the random access signal by using the configuration information corresponding to the specific beam. According to the configuration, even in a case where plural times of operation is not performed, the base station can receive the random access signal by appropriately applying the beam.

In the case of satisfying a predetermined condition while performing plural times of operation of transmitting the random access signal plural times, the transmission unit changes the configuration information set configuring the transmission pattern. The transmission unit may transmit the random access signal plural times by using the changed configuration information. According to the configuration, the probability of success of random access can be increased.

Heretofore, although the embodiments of the present invention have been described, the disclosed invention is not limited to the embodiments, and the skilled in the art will understand various modified examples, changed examples, alternatives, substituted examples, or the like. For the better understanding of the invention, explanation has been made by using specific numerical examples. However, unless particularly otherwise specified, the numerical values are merely examples, and any appropriate values may be used. The classification of items in the above explanation is not essential to the present invention. The contents described in two or more items may be used in combination as necessary. The contents described in one item may be applied to contents described in other items (unless inconsistent). In the functional block diagram, the boundaries between the functional units or the processing units are necessarily coincident with the boundaries between the physical components. The operations of the plurality of functional units may be performed physically by one component, or the operation of one functional unit may be performed physically by a plurality of components. For the convenience of description, the base station eNB and user equipment UE have been described using functional block diagrams. However, such devices may be implemented in hardware, software, or a combination thereof. According to the embodiments of the present invention, each software operated by the processors included in the user equipment UE and the base station eNB may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Complement of Embodiments

Transmission of the information is not limited to the aspects/embodiments described in the invention, but may be performed by other methods. For example, transmission of the information may be performed by physical layer signaling (such as downlink control information (DCI) or uplink control information (UCI)), upper layer signaling (such as radio resource control (RRC) signaling, medium access control (MAC) signaling, broadcast information (such as a master information block (MIB) or a system information block (SIB)), other signaling, or a combination thereof. The RRC message may be referred to as RRC signaling. An RRC message may be, for example, an RRC connection setup message or an RRC connection reconfiguration message.

The aspects/embodiments described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which the systems are extended.

Judgment or determination may be performed using a value (0 or 1) indicated by one bit, may be performed using a Boolean value (true or false), or may be performed by comparison of numerical values (for example, comparison with a predetermined value).

The terms described in this specification and/or the terms required for understanding this specification may be substituted by terms having the same or similar meanings. For example, a channel and/or a symbol may be a signal. A signal may be a message.

The user equipment UE may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several appropriate terms by those skilled in the art.

The aspects/embodiments described in this specification may be used alone, may be used in combination, or may be switched with implementation thereof. Notification of predetermined information (for example, notification of "being X") is not limited to explicit notification, but may be performed by implicit notification, for example, by not performing notification of predetermined information.

The terms "determining" and "determination" which are used in this specification may include various types of operations. The terms "determining" and "determination" may include that calculating, computing, processing, deriving, investigating, looking up (for example, looking up in a table, a database, or another data structure), and ascertaining are considered to be "determined." The terms "determining" and "determination" may include that receiving (for example, receiving of information), transmitting (for example, transmitting of information), input, output, and accessing (for example, accessing data in a memory) are considered to be "determined." The terms "determining" and "determination" may include that resolving, selecting, choosing, establishing, and comparing are considered to be "determined." That is, the terms "determining" and "determination" can include that a certain operation is considered to be "determined."

An expression "on the basis of ~" which is used in this specification does not refer to only "on the basis of only ~," unless apparently described. In other words, the expression "on the basis of ~" refers to both "on the basis of only ~" and "on the basis of at least ~."

The processing sequences and the like of the aspects/embodiments described above in this specification may be changed in the order as long as they are not incompatible with each other. For example, in the methods described in this specification, various steps as elements are described in an exemplary order and the methods are not limited to the described order.

The input and output information or the like may be stored in a specific place (for example, a memory) or may be managed in a management table. The input and output information or the like may be overwritten, updated, or added. The output information or the like may be deleted. The input information or the like may be transmitted to another device.

Notification of predetermined information (for example, notification of "being X") is not limited to explicit notification, but may be performed by implicit notification, for example, by not performing notification of the predetermined information.

Information, signals, and the like described in this specification may be expressed using one of various different techniques. For example, data, an instruction, a command, information, a signal, a bit, a symbol, and a chip which can be mentioned in the overall description may be expressed by a voltage, a current, an electromagnetic wave, a magnetic field or magnetic particles, a photo field or photons, or an arbitrary combination thereof.

The invention is not limited to the above-mentioned embodiments and the invention includes various modifications, corrections, alternatives, and substitutions without departing from the concept of the invention.

This application claims priority from Japanese Patent Application No. 2016-020323, filed on Feb. 4, 2016, and the contents of Japanese Patent Application No. 2016-020323 are incorporated by reference herein in its entirety.

EXPLANATIONS OF LETTERS OR NUMERALS

101: UL transmission unit
102: DL reception unit
103: RRC management unit
104: RA control unit
105: measurement unit
106: power control unit
152: BB processing module
153: equipment control module
154: USIM slot
201: DL transmission unit
202: UL reception unit
203: RRC management unit
204: RA control unit
205: BF management unit
251: RE module 252: BB processing module
253: equipment control module
254: communication IF

The invention claimed is:

1. A terminal comprising:
a processor configured to select a synchronization signal based on received power of a plurality of synchronization signals associated with a plurality of identifiers, each synchronization signal being transmitted by a beam, and determine a time and frequency resource corresponding to the selected synchronization signal by employing a correspondence in which the plurality of identifiers of synchronization signals are associated with a single time and frequency resource for transmitting a preamble; and
a transmitter configured to transmit the preamble to a base station using the time and frequency resource.

2. The terminal as claimed in claim 1, further comprising a receiver configured to receive a response for the preamble, wherein an RNTI that is used for CRC masking of the response is associated with an identifier of the selected synchronization signal.

3. The terminal as claimed in claim 1, wherein, when a time and frequency resource for transmitting a next preamble is the same as a time and frequency resource used in previous preamble transmission, the transmitter transmits the next preamble by increasing transmission power by power ramping.

4. The terminal as claimed in claim 2, wherein, when a time and frequency resource for transmitting a next preamble is the same as a time and frequency resource used in previous preamble transmission, the transmitter transmits the next preamble by increasing transmission power by power ramping.

5. A preamble transmission method executed by a terminal comprising:
selecting a synchronization signal based on received power of a plurality of synchronization signals associated with a plurality of identifiers, each synchronization signal being transmitted by a beam, and determining a time and frequency resource corresponding to the selected synchronization signal by employing a correspondence in which the plurality of identifiers of synchronization signals are associated with a single time and frequency resource for transmitting a preamble; and
transmitting the preamble to a base station using the time and frequency resource.

6. A base station comprising:
a transmitter configured to transmit a plurality of synchronization signals associated with a plurality of identifiers, each synchronization signal being transmitted by a beam; and
a receiver configured to receive a preamble transmitted from a terminal using a time and frequency resource, wherein a synchronization signal is selected by the terminal based on received power of the plurality of synchronization signals, and the time and frequency resource corresponding to the selected synchronization signal is determined by the terminal by employing a correspondence in which the plurality of identifiers of synchronization signals are associated with a single time and frequency resource for transmitting the preamble.

7. A communication system comprising:
a terminal that comprises:
a processor configured to select a synchronization signal based on received power of a plurality of synchronization signals associated with a plurality of identifiers, each synchronization signal being transmitted by a beam, and determine a time and frequency resource corresponding to the selected synchronization signal by employing a correspondence in which the plurality of identifiers of synchronization signals are associated with a single time and frequency resource for transmitting a preamble; and
a first transmitter configured to transmit the preamble to a base station using the time and frequency resource, and
the base station comprises:
a second transmitter configured to transmit the plurality of synchronization signals associated with the plurality of identifiers; and
a receiver configured to receive the preamble transmitted from the terminal using the time and frequency resource.

* * * * *